United States Patent
Laraia et al.

(10) Patent No.: US 7,190,178 B2
(45) Date of Patent: Mar. 13, 2007

(54) PADE' APPROXIMANT BASED COMPENSATION FOR INTEGRATED SENSOR MODULES AND THE LIKE

(75) Inventors: Jose Marcos Laraia, Pocatello, ID (US); Jose G. Taveira, Pocatello, ID (US); Robert P. Moehrke, Chubbuck, ID (US)

(73) Assignee: AMI Semiconductor, Inc., Pocatello, ID (US)

( * ) Notice: Subject to any disclaimer, the term of this patent is extended or adjusted under 35 U.S.C. 154(b) by 352 days.

(21) Appl. No.: 10/845,681

(22) Filed: May 13, 2004

(65) Prior Publication Data

US 2005/0256660 A1 Nov. 17, 2005

(51) Int. Cl.
*G01R 27/26* (2006.01)
(52) U.S. Cl. ...................... 324/685; 324/725
(58) Field of Classification Search ............... 324/685, 324/725
See application file for complete search history.

(56) References Cited

U.S. PATENT DOCUMENTS

| | | | |
|---|---|---|---|
| 4,362,060 A | 12/1982 | Okayama et al. | |
| 4,419,620 A | 12/1983 | Kurtz et al. | |
| 5,122,756 A | 6/1992 | Nelson | |
| 5,146,788 A * | 9/1992 | Raynes | 73/708 |
| 5,686,826 A | 11/1997 | Kurtz et al. | |
| 5,764,067 A | 6/1998 | Rastegar | |
| 5,848,383 A | 12/1998 | Yunus | |
| 5,902,925 A | 5/1999 | Crispie et al. | |
| 6,032,109 A * | 2/2000 | Ritmiller, III | 702/104 |
| 6,198,296 B1 | 3/2001 | Ivanov | |
| 2003/0096425 A1 | 5/2003 | Berk et al. | |

OTHER PUBLICATIONS

Baker, G. A. Jr. and Graves-Morris, P. Padé Approximants. New York: Cambridge University Press, 1996.
Dunbar and Allen, "Performance grows with integration", EE Times, Oct. 7, 2003.
Harrold, S., "Programmable analog ICs", Sensor Magazine, Apr. 2003.
McGonigal, J., "Signal conditioning", Sensor Magazine, Sep. 2003.
Mnif, K., "Compensation is critical in fitting analog pressure sensors to the application", ISD Magazine, Jul. 2001.

(Continued)

*Primary Examiner*—Vincent Q. Nguyen
(74) *Attorney, Agent, or Firm*—MacPherson Kwok Chen & Heid LLP; Gideon Gimlan

(57) ABSTRACT

Methods and systems using Pade' Approximant expansion ratios provide mappings between nonlinear sensors and a more linearized output domain. In one embodiment (a) a variable gain amplifier receives a supplied input signal, the amplifier has at least a first input terminal, an output terminal, and a gain control terminal; (b) a first summer coupled to the output terminal of the variable gain amplifier adds in a first offset signal; (c) a first multiplier coupled to an output of the first summer receives a proportional feedback factor signal and correspondingly generates a multiplied feedback; (d) a second summer coupled to an output terminal of the first multiplier adds in a corresponding second offset signal; and (e) a second multiplier coupled to an output of the second summer receives a gain factor signal and generates a multiplied gain signal; where the gain control terminal of the variable gain amplifier is operatively coupled to an output terminal of the second multiplier.

9 Claims, 19 Drawing Sheets

600

OTHER PUBLICATIONS

Travis, B., "Smart conditioners rub out sensor errors", EDN Magazine, Feb. 2001.

Wolfram Research Mathworld Web site: http://mathworld.wolfram.com/PadeApproximant.html.

Yoshii et al, "I Chip Integrated Software Calibrated CMOS Pressure Sensor with MCU, A/D Converter, D/A Converter, Digital Communication Port, Signal Conditioning Circuit and Temperature Sensor", Proceedings 1997 International Conference on Solid-State Sensors and Actuators, Chicago, Jun. 16-19, 1997, p. 1485-1488.

* cited by examiner

600

700

1000

1300

1400

1500

1600

1700

1800

1900

PADE' APPROXIMANT BASED COMPENSATION FOR INTEGRATED SENSOR MODULES AND THE LIKE

FIELD OF DISCLOSURE

The present invention relates generally to electronic systems which compensate for analog transducer nonlinearities and/or temperature drift.

More specifically, the invention relates to integrated sensor modules where a transducer is packaged together with compensating means such as electronic compensating circuitry.

CROSS REFERENCE TO PATENTS

The disclosures of the following U.S. patents are incorporated herein by reference:

(A) U.S. Pat. No. 6,198,296, issued Mar. 6, 2001 to Ivanov and entitled "Bridge sensor linearization circuit and method";

(B) U.S. Pat. No. 5,902,925, issued May 11, 1999 to Crispie et al. and entitled "System and method for high accuracy calibration of a sensor for offset and sensitivity variation with temperature";

(C) U.S. Pat. No. 5,848,383, issued Dec. 8, 1998 to Yunus and entitled "System and method for precision compensation for the nonlinear offset and sensitivity variation of a sensor with temperature";

(D) U.S. Pat. No. 5,764,067 issued Jun. 9, 1998 to Rastegar and entitled "Method and apparatus for sensor signal conditioning using low-cost, high-accuracy analog circuitry";

(E) U.S. Pat. No. 5,686,826 issued Nov. 11, 1997 to Kurtz et al. and entitled "Ambient temperature compensation for semiconductor transducer structures";

(F) U.S. Pat. No. 5,122,756 issued Jun. 16, 1992 to Nelson and entitled "Linearization of a sensing bridge circuit output";

(G) U.S. Pat. 4,419,620 issued Dec. 6, 1983 to Kurtz et al. and entitled "Linearizing circuits for a semiconductor pressure transducer"; and (H) U.S. Pat. 4,362,060 issued Dec. 7, 1982 to Okayama, et al. and entitled "Displacement transducer".

CROSS REFERENCE TO NON-PATENT PUBLICATIONS

The following publications are cited here for purposes of reference:

(a) Wolfram Research Mathworld Web site: http://mathworld.wolfram.com/PadeApproximant.html;

(b) Baker, G. A. Jr. and Graves-Morris, P. Padé Approximants. New York: Cambridge University Press, 1996;

(c) Yoshii et al, "1 Chip Integrated Software Calibrated CMOS Pressure Sensor with MCU, A/D Converter, D/A Converter, Digital Communication Port, Signal Conditioning Circuit and Temperature Sensor", Proceedings 1997 International Conference on Solid-State Sensors and Actuators, Chicago, Jun. 16–19, 1997, pg. 1485–1488;

(d) Mnif, K., "Compensation is critical in fitting analog pressure sensors to the application", ISD Magazine, July 2001.

(e) Travis, B., "Smart conditioners rub out sensor errors", EDN Magazine, February 2001.

(f) McGonigal, J., "Signal conditioning", Sensor Magazine, September 2003.

(g) Harrold, S., "Programmable analog ICs", Sensor Magazine, April 2003.

(h) Dunbar and Allen, "Performance grows with integration", EE Times, Oct. 7, 2003.

DESCRIPTION OF RELATED ART

It is often desirable to accurately sense one or more of a plethora of physical parameters, for example: temperature, pressure, force, strain, luminosity, position, angle, velocity, acceleration, and fluid flow rate. Technological advances have enabled some of these parameters to be measured by monolithically integrated and miniaturized electromechanical systems (MEMs). Even in cases where the sensing element(s) is/are discrete rather than integrated, they are often housed for convenience sake in a compact, sensor module that further contains a discrete circuit and/or a monolithic IC for providing signal conditioning and/or other sensor supporting functions. Fields of application may include automotive, medicine, aerospace and factory automation.

In areas such as automotive, where size, weight, cost and power consumption of sensors may be important and yet it is desirable to embed sensors ubiquitously about the vehicle structure in order to allow the vehicle to operate more smartly, considerable effort has been expended to developing low cost sensors that are small, accurate, reliable, and capable of operating in harsh environments. This has led to a variety of sensing elements based on different physical/electrical principles, each one optimized for its uniquely specific application and environment. It is the specialty of the different sensors that raises problems.

Many sensing elements present unique requirements and limitations that need to be somehow circumvented or compensated for. Many sensors require an appropriate excitation or power source in addition to energy that might be garnered from the physical attribute that is being sensed. Often, the electric or other signal generated by a sensor in response to a given physical attribute that is being sensed (e.g., force, displacement, velocity, acceleration, temperature or any other physical parameter that can be detected and/or measured) is comparatively weak, distorted, or simply not adequate to interface directly with the electronic or other control system that is to use the sensor output signal. As such, signal amplification and distortion removal are often desirable. The utilized amplifiers, and/or the sensors themselves normally have variations in gain and offset errors due to perturbations in their fabrication processes. Thus, these components typically have to be individually calibrated. Many sensing elements present non-ideal response functions relative to the sensed parameter(s). The non-ideal response functions may be plagued by variation of response over different temperature ranges and/or by nonlinear response to linear change in the physical parameter being measured. Various applications may require correction of these non-ideal response behaviors to one extent or another. An appropriate electronic circuit, usually referred to as a "signal conditioning circuit," is often used to take care of these requirements and is commonly made an integral part of the sensor package. Both the sensing element and the signal conditioning circuit are commonly packaged into a single, environmentally sealed, physical unit known as a sensor module or, simply, an integrated sensor. Further explanations on sensor signal conditioning and examples of available solutions can be found in the articles by Mnif, Travis, and McGonigal cited above.

Signal conditioning circuits having electronic nonlinearity correction capabilities have increasingly become an integral part of modern sensor fabrication. The conditioning circuits allow for a higher degree of accuracy and extended operation range without requiring sophisticated and expensive sensing elements. Although a number of different nonlinearity compensation techniques have been developed, they tend to be costly and time consuming to implement and frequently provide insufficient accuracy or suffer from other undesirable technical limitations. A need exists in the industry for a flexible approach.

Among the various approaches developed for dealing with sensor nonlinearity, a commonly used technique relies on source modulating feedback, where part of the amplified and measured signal is fed back to modulate the excitation source of the sensing element. This basic principle is used for resistive bridge sensors such as disclosed in U.S. Pat. Nos. 4,362,060, 4,419,620, 5,122,756, 5,686,826 and 6,198,296. Although the technique is effective to varying degrees, these source feedback techniques rely on manual, trial-and-error adjustments with use of potentiometers or selection of resistors with pre-selected values. This kind of approach is not adequate to mass production where each sensor may need individual compensation and/or calibration. Also, if fixed "average" resistor values are used for all sensors, accuracy is sacrificed because normal manufacturing variations in the sensing elements are not compensated.

In some cases, it is desirable to compensate for a sensor's nonlinear response due to temperature variations. U.S. Pat. No. 5,902,925 discloses a piecewise linear approach. U.S. Pat. No. 5,848,383 proposes a solution based on polynomial compensation. However, these approaches do not simultaneously address the nonlinearities that are inherent within the sensing ranges of many sensors, regardless of temperature variation.

Predominantly digital methods for nonlinearity compensation have also been developed. These include use of lookup tables, piecewise linear compensation, or polynomial-based compensation techniques, such as those shown in the articles by Travis and Yoshii et al cited above. Although they can be flexible and potentially accurate, implementation of these solutions normally requires provision of an adjacent microcomputer or a digital signal processor (DSP), and a substantial quantity of memory, all this increasing complexity, power consumption and cost. Also, the conventional, predominantly digital methods usually must have an A/D converter disposed directly in the input-to-output signal path. This tends to introduce speed limitations due to the sampling periods of the A/D converters. This also tends to introduce potential aliasing problems, and quantization errors.

SUMMARY

The present invention provides a nonlinearity compensation method and a corresponding structure that can be made highly accurate, can be programmably adjusted, and can be made flexible so as to be used in a wide range of applications while allowing for low cost mass production and reduced power consumption. Methods and structures disclosed herein allow for sensor calibration to take place as an integral part of nonlinearity compensation, where both functions may be implemented by the same circuit. Embodiments in accordance with the invention may be implemented as monolithic integrated circuits which use mostly analog techniques for providing signal conditioning that is free of digitization problems (e.g., quantization error and/or sample time hold up).

More specifically, in accordance with one aspect of the present invention, techniques are provided for implementing mapping functions based on the mathematics of Padé Approximants. Padé Approximants may be used to produce expandable approximations of desired mapping functions, where the approximations may be expressed as a ratio of two power series, where each power series includes a respective set of coefficients. A given Padé Approximant mapping function may be defined and/or fined-tuned by adjusting either or both of its numerator and denominator coefficients. Padé approximation mapping functions are suitable for modeling nonlinear physical behavior including behavior whose mathematical models contain poles or like singularities. In particular, it is believed that the rational functions provided by the Padé Approximant approach generally provide a better fit for modeling real world phenomenon than do the more commonly used Taylor expansions, where the latter disadvantageously call for a larger number of terms and associated coefficients in order to define an approximation to a desired degree of accuracy and precision.

Relatively accurate Padé approximations can be implemented by using low-order rational functions and correspondingly simple, inexpensive and substantially analog, nonlinearity compensating circuits. In one embodiment, all that is called for is: (a) a variable gain analog amplifier, (b) an analog offset adder coupled to an output of the amplifier; (c) a feedback attenuation element coupled to an output of the offset adder; and (d) a gain-setting circuit for the variable gain analog amplifier, where the gain-setting circuit generates a gain signal representing a first gain factor G, multiplied by one minus the output of the feedback attenuation element.

The resulting circuit behavior may be expressed as:

$$V_{out} = G \cdot (1 - k_{vf} \cdot V_{out}) \cdot V_{in} + v_{off} \quad \{\text{Eq. 1a}\}$$

By solving equation Eq. 1a for the output voltage, $V_{out}$, Eq. 1a may be re-expressed as:

$$Vout = \frac{G \cdot Vin + voff}{G \cdot kvf \cdot Vin + 1} \quad \{\text{Eq. 1b}\}$$

Then, by substituting $x = V_{in}$, $y = V_{out}$, $a = G$, $b = v_{off}$, and $c = G \cdot k_{vf}$, equation Eq. 1b may be re-expressed as the first order Padé Approximant:

$$y(x) = \frac{P_1(x)}{Q_1(x)} = \frac{ax + b}{cx + 1} \quad \{\text{Eq. 1c}\}$$

Under a more generalized formulation, the expression above (Eq. 1c) may be re-expressed as an $n^{th}$ order Padé Approximant:

$$y_2(x) = \frac{P_2(x)}{Q_2(x)} = \frac{P_n x^n + P_{(n-1)} x^{n-1} + \ldots + P_0}{Q_n x^n + Q_{(n-1)} x^{n-1} + \ldots + 1} \quad \{\text{Eq. 1d}\}$$

It will be seen that a wide variety of mapping functions can be approximated by appropriate adjustment of the three coefficients, a, b and c in the first order equation, Eq. 1c. For example, by setting c=0, the linear mapping equation, y=ax+b is obtained. By setting a=0, the nonlinear mapping equation, y=b/(cx+1) is obtained. The input variable, x, may be replaced by the translated variable $(x-x_0)$ to obtain a horizontally translated mapping function. The output variable, y, may be replaced by the translated variable $(y-y_0)$ to obtain a vertically translated mapping function. Either of x and y may additionally have its polarity inverted: x'=−x or y'=−y in order to provide for 180 degree rotations of the mapping function on the x-y graphing grid.

A nonlinearity compensation circuit in accordance with the invention can be placed anywhere in the analog signal path of the sensor module. The compensation function can include compensation for the compensator's internal non-linearities and for nonlinearities of other circuits in the reporting path. Because the compensation does not necessitate adjustment of a sensor excitation signal (as would for example, a resistance bridge circuit), the sensor excitation signal may be kept constant or it may be made ratiometric to the supply voltage. This allows for a simpler design and can help to ensure that the sensor excitation voltage or current will be within an optimal range as may be required by the unique circumstances of each sensor and its use. As an additional benefit, the nonlinearity compensation circuit can also provide sensor calibration, thus further reducing overall complexity and cost. When compared to the predominantly digital methods for nonlinearity compensation, where large lookup tables, microprocessors and/or the like are employed, the embodiments in accordance with the present invention enable much simpler and smaller circuits that can be built at significantly lower costs.

Although they are disclosed in the context of sensing applications, the function mapping circuits and techniques here disclosed can be general in scope and can be applied in other uses, such as audio, video, imaging, or in any situation where a nonlinear mapping function is to be electronically provided.

A method is provided in accordance with the invention for mapping an input signal to a corresponding output signal. One embodiment of the method comprises: (a) providing a programmable transforming unit that operates in accordance with a Pade' Approximant ratio having respective numerator and denominator coefficients; and (b) programmably adjusting the transforming unit to thereby establish respective numerator and denominator coefficients that cause the transforming unit to provide a desired Pade' Approximant mapping between a supplied input signal having at least three (3) input reference points and a corresponding output signal having at least three (3) standardized output values on a one-for-one basis corresponding to said at least three (3) input reference points.

Other aspects of the invention will become apparent from the below detailed description.

BRIEF DESCRIPTION OF THE DRAWINGS

The below detailed description section makes reference to the accompanying drawings, in which.

DETAILED DESCRIPTION

Figure 11:
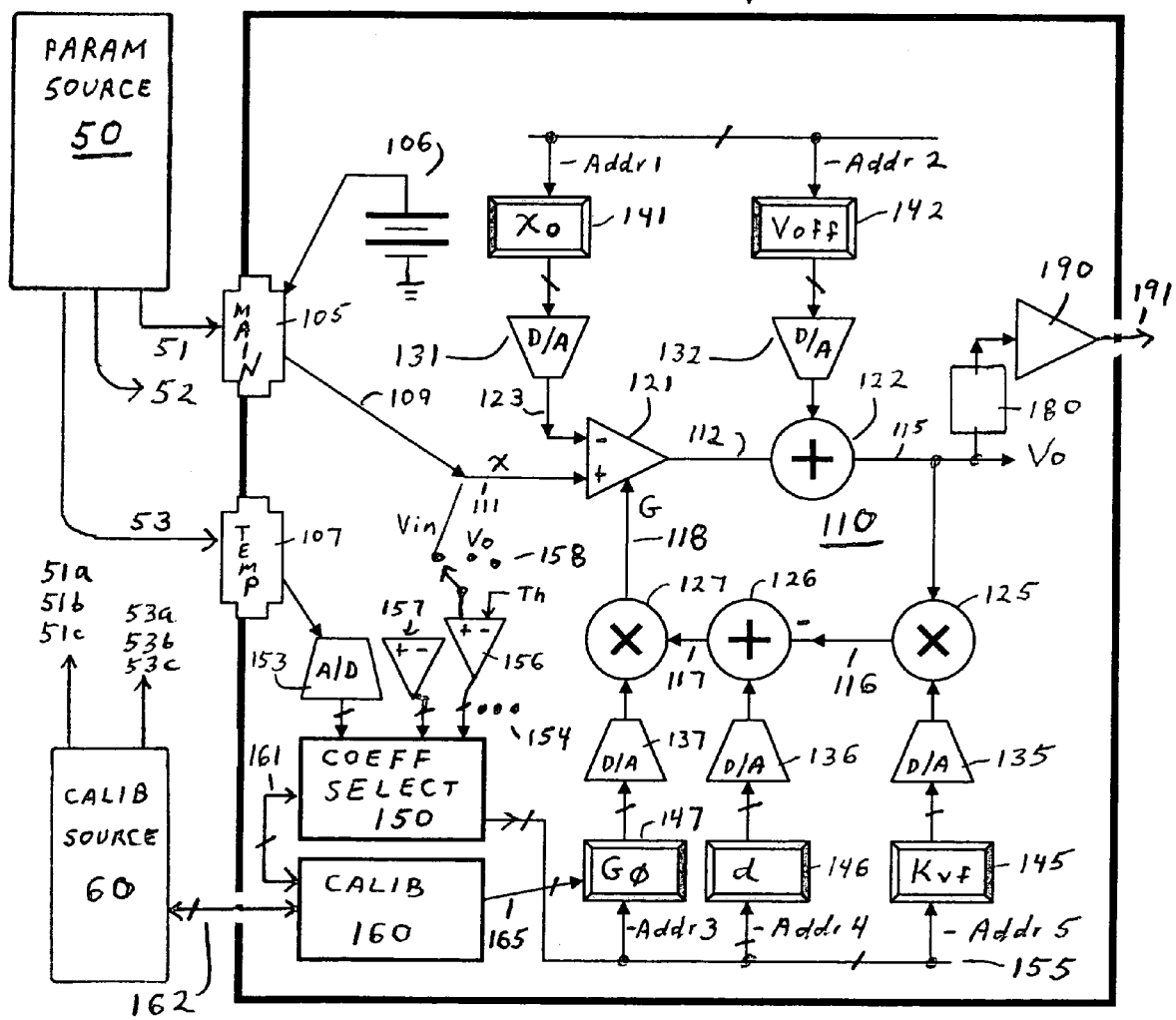
FIG. 11 is a block diagram of a sensor and sensor-containing environment in accordance with the invention.

The following description is illustrative only and not limiting. Referring to FIG. 11, a block diagram is provided of a sensor module 101 and sensor-containing environment 100 in accordance with the invention. The sensor-containing environment 100 includes a primary parameter source 50 for supplying a primary physical parameter 51 that is to be measured by a corresponding, primary sensor 105. Both the sensor module 101 and the primary parameter source 50 may be provided adjacent to one another and situated in an application environment 100, such as an automobile (e.g., adjacent to the hot engine of a car) or a factory (e.g., within mass production machinery which is subject to vibrations or other stresses), or a medical care facility (e.g., insulatively coupled to an ill patient who does not have access to a large power source) or another environment having similarly challenging characteristics.

The primary physical parameter 51 that is to be measured or tracked by the primary sensor 105 can be a physical position or orientation (including angle), an applied force, sound waves, a gas or fluid pressure, a speed, a velocity, an acceleration, or any physical attribute that is detectable by a suitably adapted sensor 105. In addition to the primary, to-be-measured parameter 51, the primary parameter source 50, or the application environment 100 may generate interfering physical parameters 52 such as temperature variations, noise on power lines, mechanical vibrations, or other such physical attributes that can interfere with the measuring functions of the primary sensor 105. Coupling 53 represents an optional link to an ancillary temperature sensor 107 of the module 101. This temperature sensor 107 may be integrated within the compensating electronics (e.g., as a temperature-sensing bipolar junction transistor (BJT) or as a temperature modulated oscillator) and its use will be described below.

The primary sensor 105 (there could be more than one associated with and/or embedded in module 101) can be any of a wide variety of physical-parameter sensing devices including but not limited to those for accurately sensing and measuring an optical signal, a magnetic signal, an electrostatic signal (charge intensity), sound waves, changes in the acceleration of a housing (not shown) of the module 101 or other such varying kinds of physical parameters. In some cases, the primary sensor 105 may require one or more excitational sources (schematically represented by battery symbol 106) such as a precision DC and/or AC power supply in order to function properly. The primary sensor 105 may require one or more reference signal sources (e.g., a frequency reference) for enabling the sensor to work properly. Typically, for convenience and performance, these sensor-supporting, excitational and/or reference providing components (106) are provided in the same module 101 that houses the primary sensor 105.

The immediate output signal of the primary sensor 105 is generally an analog electrical signal whose voltage and/or current represents a corresponding magnitude or other attribute of the to-be-measured, primary physical parameter 51. The immediate output signal of the primary sensor 105 may alternatively or additionally be optical in nature, or magnetic or presented in some other energy form. An energy transmission path 109 operatively couples the immediate output signal of the primary sensor 105 to an input node 111 of a core-mapping circuit 110 described here. The immediate output signal of the primary sensor 105 may be converted in form, changing for example, from a current signal to a voltage signal as it is transmitted along the transmission path 109. It will be assumed here that the input signal, x, of the core-mapping circuit 110 is in the form of a voltage signal, $V_{in}$. Other forms of signaling are within the contemplation of the present invention (e.g., where x is an optical or other form of input signal and variable gain amplifier 121 is configured to receive such an optical or other form of input signal).

The core-mapping circuit 110 includes the variable gain, input amplifier 121 (mentioned above), a first summing unit 122, a first multiplier 125, a second summing unit 126 and a second multiplier 127; organized as shown to define a feedback loop. In one embodiment, each of the components in the feedback loop: 121, 122, 125, 126 and 127 is an analog, signal processing component, implemented for example with low-power CMOS circuitry in an integrated circuit configuration so as to reduce power consumption and physical size. When such an all-analog feedback loop is used, problems associated with digital feedback can be obviated. More specifically, both digital sampling delay and digital quantization error may be eliminated, thereby providing a relatively fast and accurate mapping from an input signal domain (the x signal) to an output signal range ($y=V_{out}$). Power consumption can also be reduced even though such an outcome would not be expected from analog circuitry. The core-mapping circuit 110 can be programmably configured to simultaneously provide calibration and nonlinearity compensation. Because one set of components is used for simultaneously providing both functions (calibration and nonlinearity compensation) the same amount of power is consumed for both functions as opposed to having different sets of components consume power and supply the functions separately. Also, in one embodiment, either or both of components 125 and 127 are attenuating rather than amplifying multipliers. (As used herein, multiplying can entail either amplification or attenuation.) Attenuation usually consumes less Vcc power than amplification because additional power has to be supplied to power amplifying multipliers in order for them to produce output signals with power greater than the power supplied by input signals (e.g., a resistive attenuator or voltage splitter generally does not need a Vcc supply for drawing additional power).

The variable gain amplifier 121 has a gain-control terminal 118 for defining its gain factor, G. For sake of simplicity, it will be assumed here that application of G volts to terminal 118 produces a corresponding, unit-less gain factor of G for amplifier 121. In other words, there is a conversion factor of 1:1 per volt at terminal 118. More typically there will be some other conversion factor between volts presented at terminal 118 and actual gain realized by the amplifier 121. In such a latter case, a countering factor will be applied to the voltage values presented on lines 116 and 117. Artisans skilled in the art will understand how to do so.

The illustrated variable gain amplifier 121 further has a negative input-offset terminal 123 for optionally adding a negative offset to the input signal, $X=V_{in}$. Thus, the output signal 112 of amplifier 121 can be expressed as $G \cdot (x-x_0)$ volts, where G is unit-less in this case and $x_0$ is an analog offset signal supplied by digital-to-analog (D/A) converter 131. Such an offset is optional, and in an alternate embodiment, terminal 123 as well as D/A converter 131 and memory unit 141 are not present. In one embodiment, the variable gain amplifier 121 has high impedance input terminals, 111 and 123 (e.g., greater than about 100 KΩ each), for receiving the respective x and $x_0$ input signals. The output terminal 112 of the variable gain amplifier provides a correspondingly amplified, voltage output signal at low output impedance (e.g., (e.g., less than about 100Ω). The first summing unit 122 adds an offset signal, $v_{off}$, thus causing the voltage signal on line 115, Vo to be equal to $G \cdot (x-x_0)+v_{off}$. The first multiplier 125 multiplies the Vo signal by a feedback factor, $k_{vf}$, thus causing the voltage on line 116 to be equal to $k_{vf} \cdot V_o$. As mentioned, in one embodiment, $k_{vf}$ is less than unity. In the same or another embodiment, $k_{vf}$ is set sufficiently small so that the product, $k_{vf} V_o$ will remain below a predetermined maximum, say d volts. The second summing unit 126 adds another offset signal, d, and inverts the signal on line 116, thus forming the voltage signal, $d-k_{vf} V_o$ on line 117. In an alternate embodiment, d is a constant reference voltage such as that representing 1 unit and D/A converter 136 and memory unit 146 are not present. The second multiplier 127 of the core mapping circuit 110 multiplies the signal on line 117 by a supplied gain signal, $G_0$, thus causing the voltage signal on line 118 to be equal to $G_0 \cdot (d-k_{vf} V_o)$. As explained above, it is assumed here that terminal 118 performs a 1-to-1 per volt conversion for establishing the unit-less gain factor of amplifier 121. In one embodiment, the multiplying factor on input line 117 of multiplier 127 is less than unity. In the same or another embodiment, coefficients are set sufficiently small so that the product, $G_0 \cdot (d-k_{vf} V_o)$ will remain below a predetermined maximum voltage, say d volts.

By solving for $V_o$ along the forward signal path of amplifier 121 and summing unit 122, it may be shown that:

$$V_o = G_0 \cdot (d - k_{vf} V_o) \cdot (x-x_0) + v_{off} \qquad \{\text{Eq. 2a}\}$$

Further solving for $V_o$, it may be shown that the ratio in equation Eq. 2b is obtained:

$$V_o = (d \cdot G_0 \cdot (x-x_0) + v_{off}) / (k_{vf} G_0 \cdot (x-x_0) + 1) \qquad \{\text{Eq. 2b}\}$$

Substituting $a=d \cdot G_0$, $b=v_{off}$, $c=k_{vf} \cdot G_0$, the more standard, first order Padé Approximant mapping function is obtained:

$$V_o=(a \cdot (x-x_0)+b)/(c \cdot (x-x_0)+1) \quad \{\text{Eq. 2c}\}$$

If the $(x-x_0)$ term is simplified by setting $x_{0=0}$, and $V_0$ is expressed as $y$, then Eq. 2c simplifies to:

$$y=(a \cdot x+b)/(c \cdot x+1) \quad \{\text{Eq. 2d}\}$$

It may be appreciated from equation Eq. 2c that the condition, $c \cdot (x-x_0)=-1$ is to be generally avoided. However, in some applications where a saturated output response and/or oscillation is desirable, that condition $\{c \cdot (x-x_0)=-1\}$ may be allowed to occur. Oscillation suppression means (e.g., frequency domain filters) may be incorporated into the feedback loop as appropriate to suppress undesirable oscillations.

Each of the loop-controlling, analog coefficients: $x_0$, $v_{off}$, $k_{vf}$, d, and $G_0$ may be generated by respective digital-to-analog (D/A) converters such as are respectively shown at 131, 132, 135, 136 and 137. In turn, each of the D/A converters 131, 132, 135, 136 and 137 may receive a coefficient-defining digital input signal from a respective one of the illustrated registers and/or memory units, 141, 142, 145, 146 and 147. In one embodiment, one or more of the memory units includes a nonvolatile memory unit such as FLASH or EEPROM. In one embodiment, the analog coefficient, d, is set to a constant value such as 1 and D/A converter 136 as well as its corresponding memory unit 146 are dispensed with. In the same or an alternate embodiment, the analog offset coefficient, $x_0$, can be set to a constant value such as 0 and the corresponding D/A converter 131 as well as its corresponding memory unit 141 can be eliminated. Generally, the core-mapping circuit 110 may provide a wide variety of mapping functions even if just 2 or 3 of its coefficients (e.g., $V_{off}$, $k_{vf}$ and $G_0$) are made programmably variable while the other coefficients are fixed. One can reduce cost, increase reliability, reduce power consumption and/or reduce module size by reducing the number of programmably adjustable components in the core-mapping circuit 110 and/or in the encompassing module 101. It is within the contemplation of the invention to have a plural number of core-mapping circuits like 110 within the same module 101, with each mapping circuit 110 providing mapping for a respective one of plural sensors.

Each of the loop-controlling, digital memory units 141 (optional), 142, 145, 146 (optional) and 147 may be driven by a respective address input signal: $\text{Addr}_1$, $\text{Addr}_2$, $\text{Addr}_3$, $\text{Addr}_4$, and $\text{Addr}_5$, of appropriate bit width, the bit width being defined by the number of different coefficient values that each such digital memory unit is to store in a given time. For example, if memory unit 147 is to store no more than 8 $G_0$ values, then 3 bits will suffice for address input signal $\text{Addr}_3$. On the other hand, if memory unit 145 is to store no more than 32 predetermined values of $k_{vf}$, then 5 bits will suffice for address input signal $\text{Addr}_5$. In some applications, the coefficient registers or memory output signals will have at least between 8 and 11 data bits to support desired ranges of coefficient granularity. The storage capacities and address input widths of the loop-controlling, digital memory units 141 to 147 may be configured as appropriate for a given application.

Figure 8:
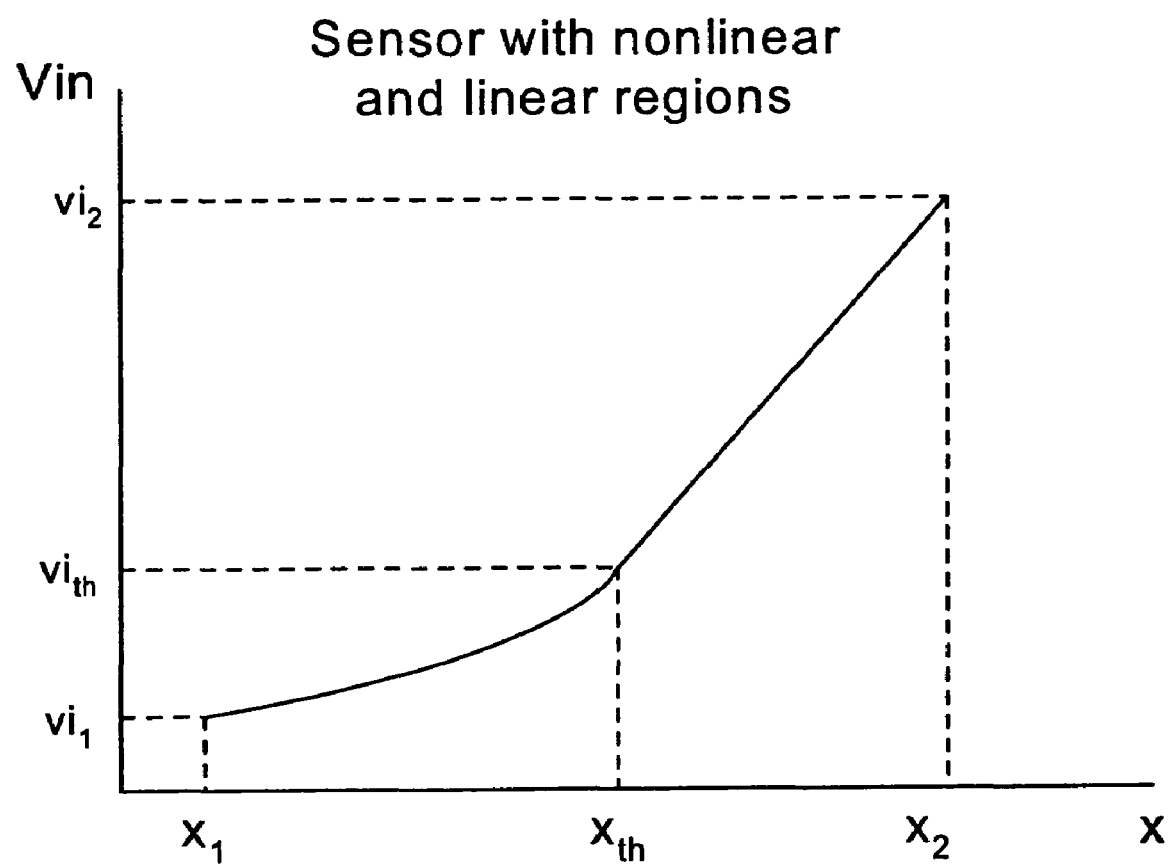
FIG. 8 is a graph representing a sensor with a piecewise linear response region and a piecewise nonlinear response region.

Address input signals, $\text{Addr}_1$, $\text{Addr}_2$, $\text{Addr}_3$, $\text{Addr}_4$, and $\text{Addr}_5$, are obtained from an in-module address bus 155. A coefficient selecting logic unit 150 drives address bus 155 so as to select appropriate loop coefficients for various conditions. The logic-selectable loop coefficients may be changed in response to a variety of input signals, including but not limited to a temperature change indication signal provided by Analog-to-Digital (A/D) converter 153 (where 153 is driven by a signal from sensor 107) and/or a crossing over of an input signal boundary point as signaled by threshold detector 156 (a digital comparator). There may be two or more boundary point detectors as is represented schematically by the dots 154. A boundary-crossing condition does not necessarily have to be detected on the input node 111. It may instead be detected in the swept signal range of output node 115, or on amplifier output line 112, or elsewhere as appropriate. A digitally-operated selection switch 158 may be actuated by an in-module calibration controller 160 as appropriate for establishing which signal range will be used for detecting a coefficient change-over condition. A coefficient-change-over condition is one where the mapping function is piece-wise changed from one function to another as will become clearer when FIG. 8 is discussed. Bus 161 couples the calibration controller 160 to the coefficient selecting logic unit 150. Command bus 162 couples the calibration controller 160 to an external calibration source 60. Command bus 162 may supply new coefficient data values to respective ones of the loop-controlling, digital memory units by way of the calibration controller 160 and data input bus 165. (Although not fully shown, data input bus 165 operatively couples also to each of memory units 141, 142, 145 and 146.) During calibration, external calibration source 60 is attached to module 101 to provide to the primary sensor 105, a standardized set of at least 3 different instances 51a, 51b, 51c of the to-be-measured parameter 51. See briefly FIG. 5. The standardized set 51a, 51b, 51c of the to-be-measured parameter 51 may be supplied in a predetermined sequence in some embodiments while a calibration pin (not shown) of the module 101 is actuated. The external calibration source 60 may also provide a corresponding, standardized set of three respective temperatures, 53a 53b, 53c to the ancillary temperature detector 107. An output signal 191 of the module's output driver 190 is measured during calibration, and appropriate coefficient values are derived for the loop coefficients $x_0$ (optional), $V_{off}$, $k_{vf}$, d (optional), and $G_0$ and stored in the memory units. Methods for deriving the loop coefficients will be described below in conjunction with Padé Approximants.

Padé Approximants may be derived as an expanded ratio of two power series where the numerator and denominator coefficients are defined to provide desired transformations. Padé Approximants are often superior to Taylor expansions when used to provide mapping functions that contain poles or approach pole-like behavior.

In its general form, a Padé Approximant is the ratio between two polynomial power series:

$$P_L(x)=p_0+p_1x+p_2x^2+\ldots +p_Lx^L$$

$$Q_m(x)=1+q_1x+q_2x^2+\ldots +q_Mx^M$$

where QM(x) was normalized to QM(0)=1.

A Padé Approximant y(x) with 1st order polynomials at both numerator and denominator can therefore be written as:

$$y(x)=\frac{P_1(x)}{Q_1(x)}=\frac{ax+b}{cx+1}$$

The above, x-to-y mapping function, y(x) can be used for sensor nonlinearity compensation, where x is defined as a measurement-representing signal obtained from directly or indirectly from the sensing element. ("x" can be a measure of voltage, current, or electrical charge for example.). Similarly, y(x) in the above equation can represent the corresponding electric signal after being compensated for non-linearity and the a, b, c terms can be the sensor-specific coefficients that compensate for nonlinearity and also provide calibration. It will be seen that y(x) does not have to be the final output signal, which represents the physical parameter being measured. Module output signal 191 of FIG. 11 can be that parameter-representing signal. The y(x) signal can be an intermediary compensating signal that accounts for non-ideal behavior both in the upstream, primary sensor 105 and in downstream components such as filter 180 and output driver 190.

Figure 1:
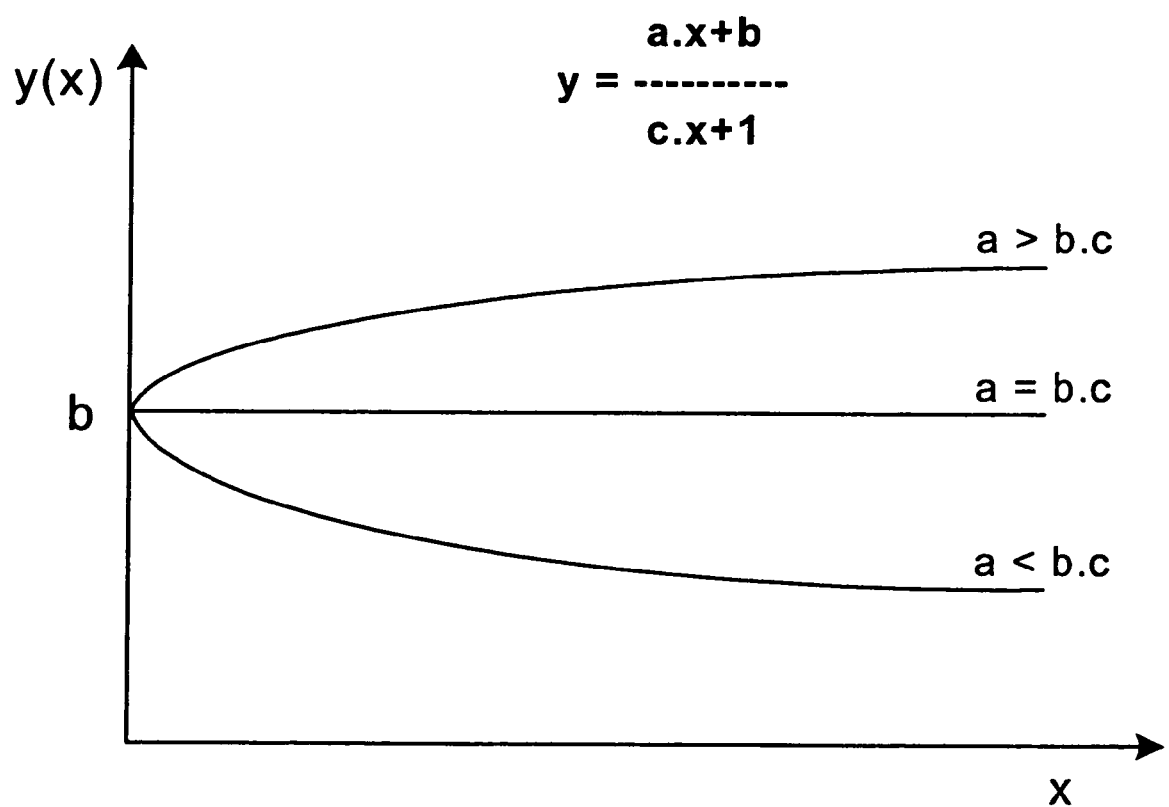
FIG. 1 is a first graph showing three possible plots of three realizations of a first order Padé Approximant.
Figure 2:
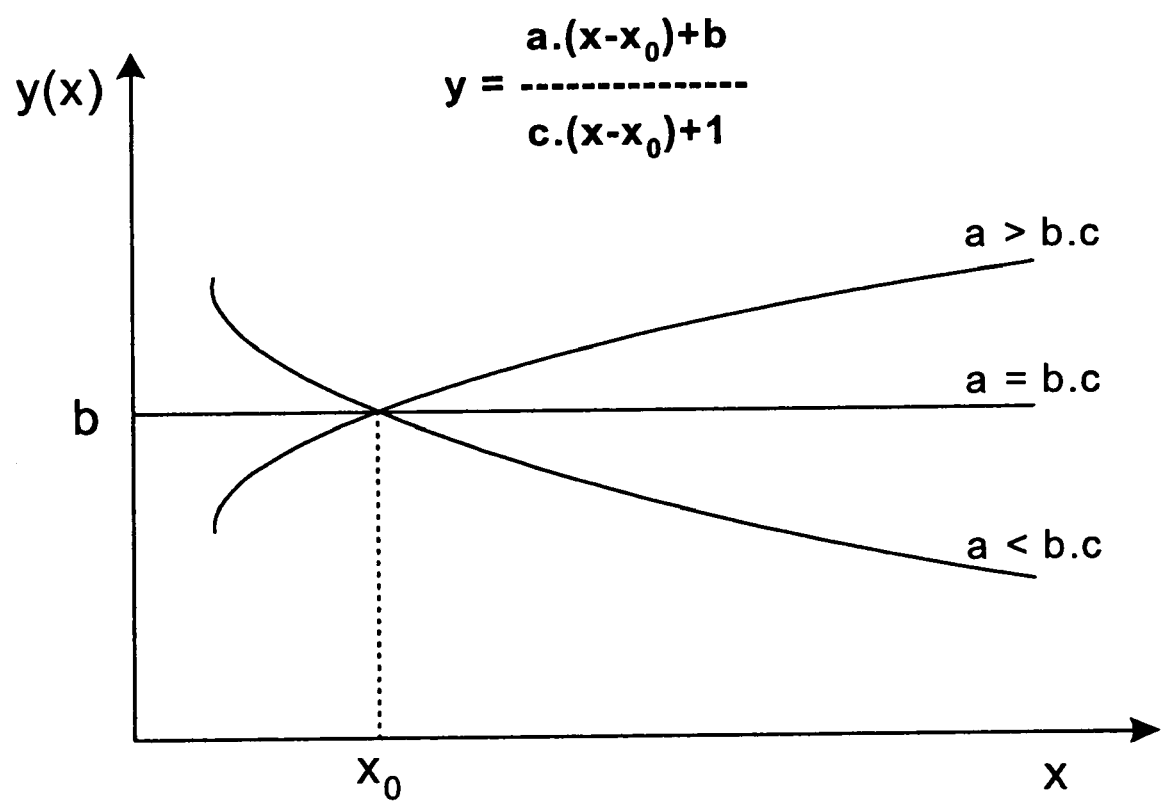
FIG. 2 is a second graph showing three possible plots of three realizations of a first order Padé Approximant with x-axis translation.
Figure 3:
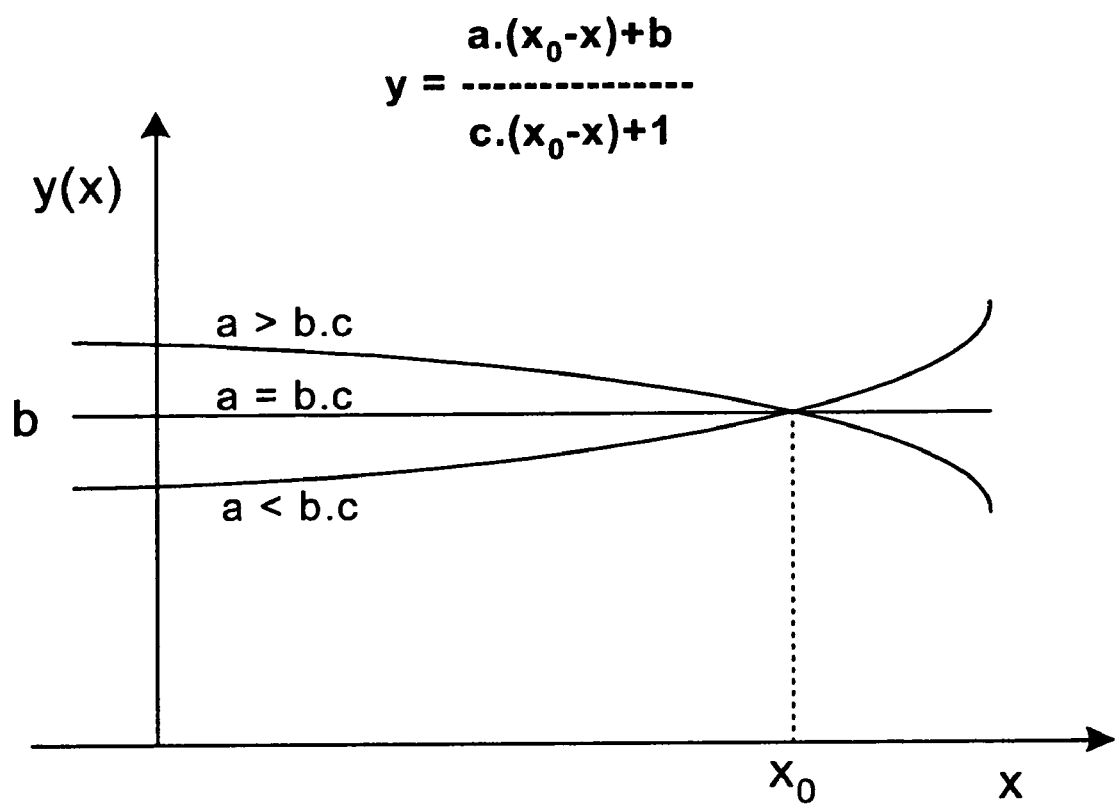
FIG. 3 is a third graph showing three possible plots of three realizations of a first order Padé Approximant with x-axis rotation.

By appropriately adjusting the magnitude of Pade' Approximant coefficients like a, b, and c, different types of useful mapping functions, including nonlinearity compensating functions, can be achieved. FIGS. 1, 2, and 3 show some possible transfer functions.

It may be seen from FIGS. 1, 2, and 3 that the position, orientation, and slope of each curve can be adjusted by the three coefficients, a, b, and c. In the special cases where a equals b times c, the output, y(x) reduces to the constant, b. This result is generally not useful for nonlinearity compensation. (See however, FIG. 9.) If either of the conditions, a>b·c or a<b·c is met, then nonlinearity compensation can be performed and the following identities are readily verified:

$$\text{for FIG. 1: } \left\{ \begin{array}{l} y(0) = b \\ \lim_{x \to \infty} y(x) = \frac{a}{c} \end{array} \right\}$$

$$\text{for FIG. 2: } \left\{ \begin{array}{l} y(x_0) = b \\ \lim_{x \to \infty} y(x) = \frac{a}{c} \end{array} \right\}$$

$$\text{for FIG. 3: } \left\{ \begin{array}{l} y(x_0) = b \\ \lim_{x \to -\infty} y(x) = \frac{a}{c} \end{array} \right\}$$

Figure 4:
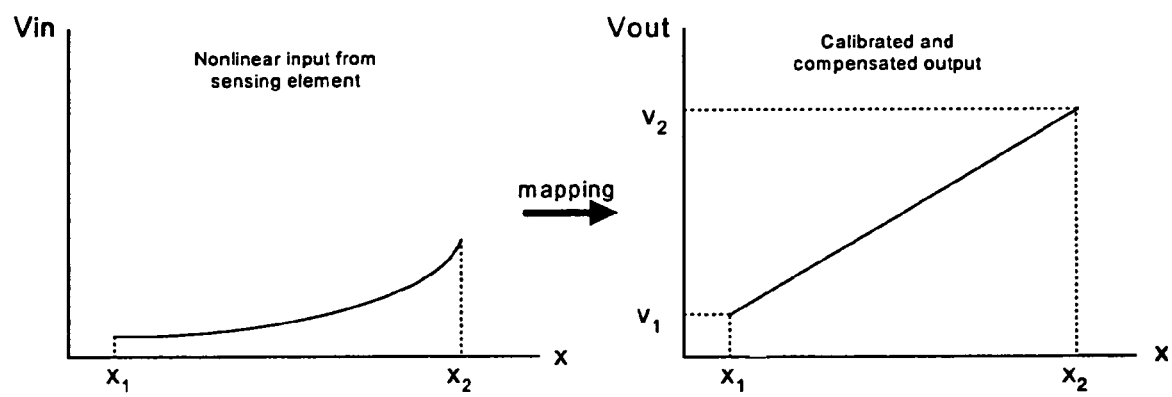
FIG. 4 is a schematic showing a mapping of a nonlinear sensor response curve to a calibrated and linearized response curve.

Sensor conditioning circuits often require gain and offset calibration. A desirable low cost solution may be obtained by combining all gain/offset calibration and nonlinearity compensation in a same functional block. Circuit size may be reduced, power consumption may be reduced, and more importantly, the number of steps needed for achieving all gain/offset calibration and nonlinearity compensation can be reduced. FIG. 4 illustrates this concept. A given non-calibrated sensing element is assumed to have a useful sensing range $x_1$ to $x_2$. The sensing element is assumed to generate a nonlinear output voltage signal, Vin, which may either come directly from the sensing element or after a preamplifier and/or filter has processed the output signal of the sensing element. In either case, the value of Vin for a given x input value will often vary from sensor to sensor, due to manufacturing tolerance problems and/or other attributes of the sensing element. The solution to the problem lies in programmably mapping the Vin versus x function (left side of FIG. 4) for a given sensing range, into the Vout versus x function (right side of FIG. 4), where the Vout function is a linear function of the physical parameter x and the Vout values represent the calibrated values V1 and V2 (see also FIG. 5) when the sensed physical parameter has standardized values x1 and x2, respectively.

Figure 5:
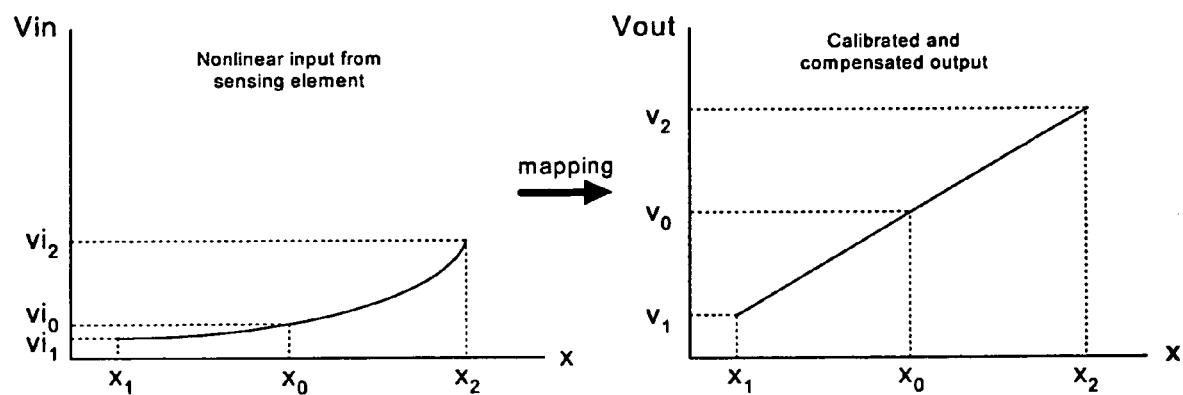
FIG. 5 is a schematic similar to FIG. 4 but further showing three calibration input parameters and their mapping to the calibrated and linearized response curve.

To solve this problem, an intermediate third point, x0, is introduced preferably halfway between x1 and x2, as shown in FIG. 5. x1, x2 and x0 are the calibration points and the Vin voltages generated at the calibration points are vi1, vi2 and vi0, respectively. By applying a 1st order Padé Approximant to the input voltage Vin and replacing the values at the calibration points, a system with three linear equations and three variables can be obtained as follows:

$$\frac{a \cdot Vin + b}{c \cdot Vin + 1} = Vout$$

$$\left\{ \begin{array}{l} a \cdot vi_0 + b - c \cdot vi_0 \cdot v_0 = v_0 \\ a \cdot vi_1 + b - c \cdot vi_1 \cdot v_1 = v_1 \\ a \cdot vi_2 + b - c \cdot vi_2 \cdot v_2 = v_2 \end{array} \right\}$$

The voltages at the calibration points can be measured and the coefficients a, b, and c may then be determined by, for example, using determinants (Cramer's Rule):

$$a = \frac{D_a}{D} \qquad b = \frac{D_b}{D} \qquad c = \frac{D_c}{D}$$

where $$D = \begin{vmatrix} vi_0 & 1 & -vi_0 \cdot v_0 \\ vi_1 & 1 & -vi_1 \cdot v_1 \\ vi_2 & 1 & -vi_2 \cdot v_2 \end{vmatrix} \qquad D_a = \begin{vmatrix} v_0 & 1 & -vi_0 \cdot v_0 \\ v_1 & 1 & -vi_1 \cdot v_1 \\ v_2 & 1 & -vi_2 \cdot v_2 \end{vmatrix}$$

$$D_b = \begin{vmatrix} vi_0 & v_0 & -vi_0 \cdot v_0 \\ vi_1 & v_1 & -vi_1 \cdot v_1 \\ vi_2 & v_2 & -vi_2 \cdot v_2 \end{vmatrix} \qquad D_c = \begin{vmatrix} vi_0 & 1 & v_0 \\ vi_1 & 1 & v_1 \\ vi_2 & 1 & v_2 \end{vmatrix}$$

The above, Cramer's Rule method should theoretically provide exact nonlinearity compensation and calibration at the supplied parameter points: $x_1$, $x_2$ and $x_0$. Because many sensors behave monotonically, there usually will be a good fit at the other parameter points as well, as long as the intrinsic sensor nonlinearity is not too severe. The calibration points do not necessarily have to be chosen as described. Any three points inside the sensing range may be selected, keeping in mind the resulting accuracy will be higher near the calibration points. Moreover, coefficients for the mapping function may be determined on a trial and error basis and/or other bases as may be appropriate in given circumstances.

Figure 6:
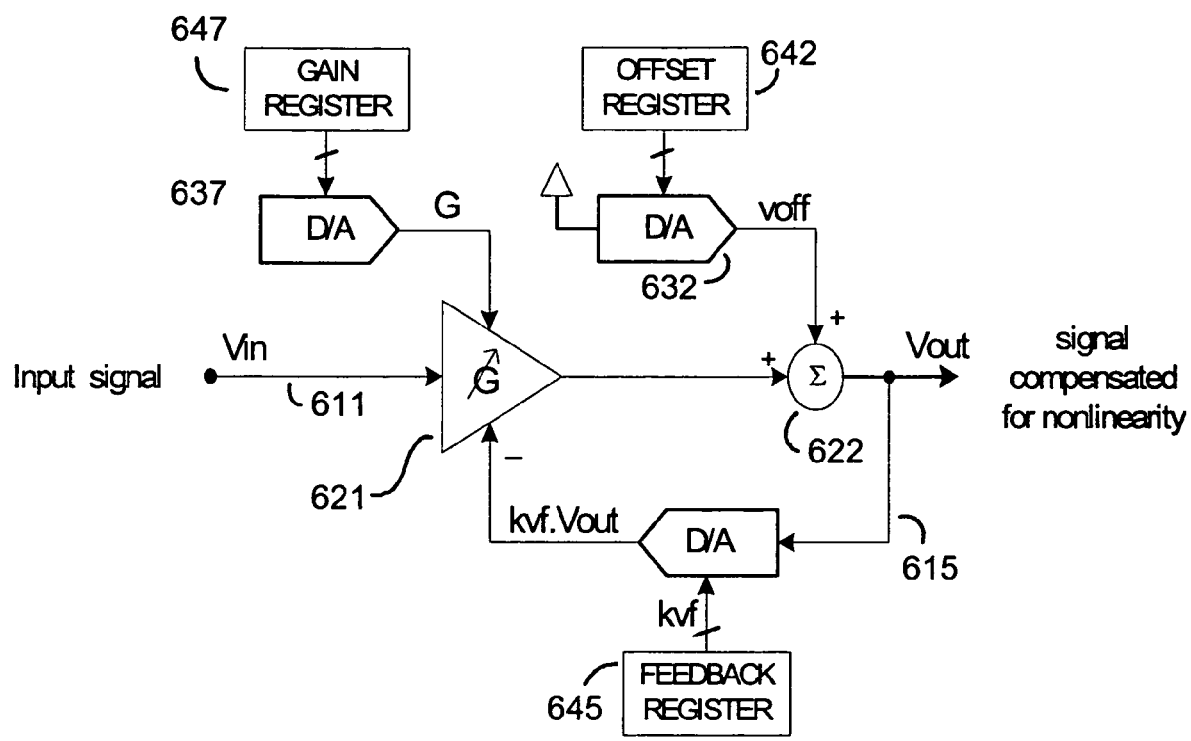
FIG. 6 is a schematic of a first order Padé Approximant compensating circuit.

FIG. 6 shows a simplified block diagram of one embodiment 600 of the invention, assuming operation in the voltage domain. Although element 632 is shown as a D/A converter, it is understood to have an analog input signal and an analog output signal with its gain or attenuation being defined by the digital signal from register 642. Slashed signal lines are often used in the drawings to indicate lines carrying digital rather than analog signals. The circuit implementation 600 involves applying a programmable offset $v_{off}$ and a programmably-established gain factor, G (unit-less) to the input voltage $V_{in}$ (where the input voltage appears on line 611). Also, a feedback voltage obtained from the output voltage $V_{out}$ attenuates the loop gain according to a third programmably-established parameter, $k_{vf}$, and the following transfer function is then realized:

$$Vout = G \cdot (1 - kvf \cdot Vout) \cdot Vin + voff$$

Once again, by solving for Vout, the expression above can also be written as:

$$Vout = \frac{G \cdot Vin + voff}{G \cdot kvf \cdot Vin + 1}$$

Comparing the function above with the 1st order Padé Approximant, it should now become apparent that they represent the same function when the following replacements are performed:

a=G b=voff c=G·kvf

Therefore, the parameters G, voff, and kvf can be determined directly from the a, b, c coefficients calculated from the calibration points measurements. These coefficients may be programmed into nonvolatile memory (e.g., EEPROM or Flash), from where they can be downloaded into registers (642, 647, 645) that control gain, offset and feedback through dedicated D/A converters (632, 637 and 635), as shown in FIG. 6. The programmable building blocks in this circuit 600 may be constructed of well known components (See for example the articles by Harrold, and Dunbar & Allen cited herein and incorporated by reference).

Figure 7:
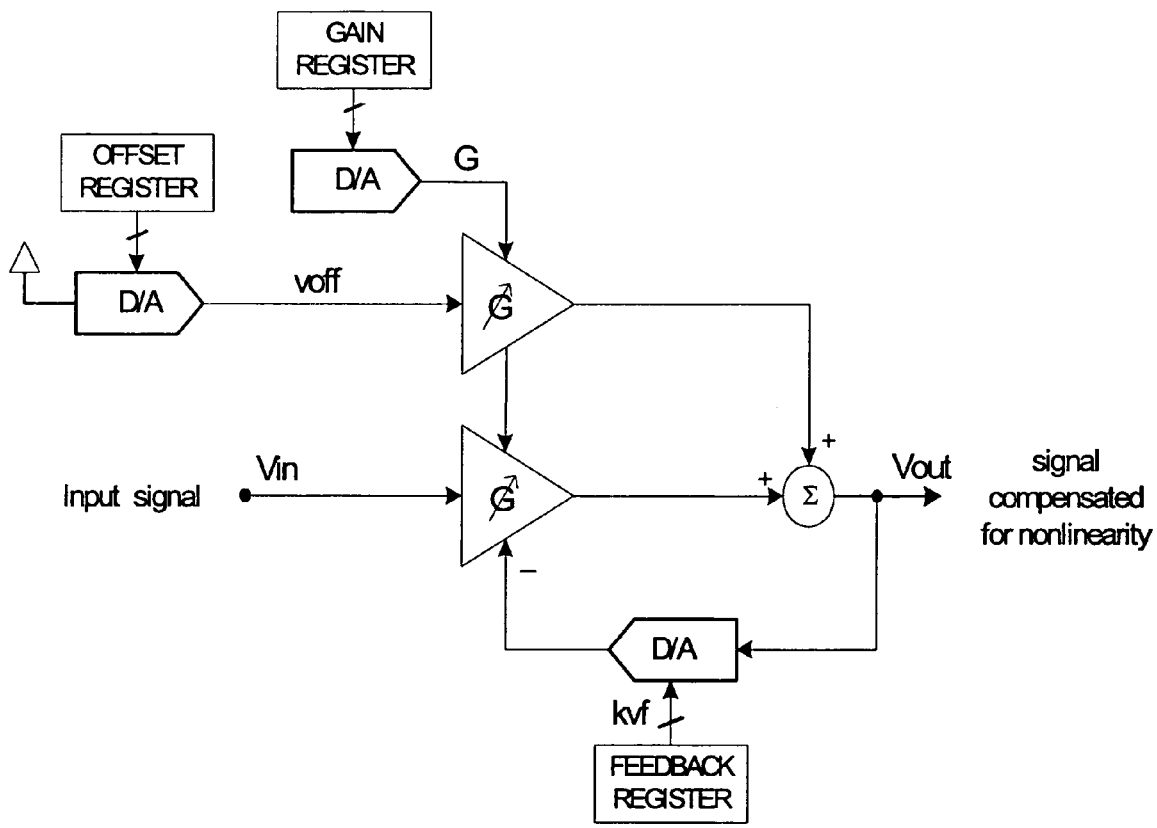
FIG. 7 is a schematic of another first order Padé Approximant compensating circuit.

A second embodiment 700 is shown at FIG. 7, where the gain G is now applied to both Vin and voff. In the case of embodiment 700 the transfer function is slightly different as follows:

Vout=G·(1−kvf·Vout)·Vin+G·voff $$Vout = \frac{G \cdot (Vin + voff)}{G \cdot kvf \cdot Vin + 1}$$

Also, the new correspondences with the Padé Approximant coefficients are:

a=G b=G·voff c=G·kvf

It should become apparent from the above that many other possible implementations of Padé' Approximant emulating circuits may be formulated for generating a mapping function according to a 1st Padé Approximant and for carrying out the mapping between input and output electromagnetic signals such as an input voltage to an output other electric signal. In each case the appropriate choice will depend on the sensor characteristics and on the sensor and circuit operation mode (e.g., voltage, current, or electric charge). While it has been assumed to this point that the primary sensing element had a single, well-defined nonlinearity characteristic, this is not necessarily true for all sensors, as certain kinds of sensors have two or more regions with clearly distinct characteristics that can benefit from piecewise compensation. A good example can be seen in the graph of FIG. 8, which illustrates the average or peak voltage signal output by certain kinds of inductive sensors when excited by an alternating current. The sensing range for the primary sensor represented by FIG. 8 can be divided into two sub-ranges: x1 to xth, where there is substantial sensor nonlinearity, and xth to x2, where the sensor is substantially linear. Either the embodiment of FIG. 6 or of FIG. 7 can be adapted to handle the sensor with the above, piecewise differentiated behavior with the following additions to their circuitry:

i) First, a comparator is added to verify whether Vin is below or above the threshold input voltage, vith.

ii) Second, if Vin<vith, it is determined that the sensor is in the nonlinear region and compensation should be applied.

iii) Third, if Vin>vith, it is determined that the sensor is in the linear region. The feedback path is broken open, or eliminated (or the kvf feedback coefficient is zeroed) and the new circuit transfer function is simply one of the two below for the embodiments of FIG. 6 and FIG. 7, respectively:

Vout=G·Vin+voff or

Vout=G·(Vin+voff)

These are simply standard gain/offset linear calibration functions. Therefore the piecewise different behavior of the sensor can be compensated for simply by changing the coefficients. Different sets of G and voff coefficients may be stored for the nonlinear and the linear sub-ranges. This concept can be extended for a plurality of nonlinear and linear sensor sub-ranges, each one requiring additional calibration steps, an extra window comparator, and another set of coefficients. The concept is seen at 154 of FIG. 11.

Figure 9:
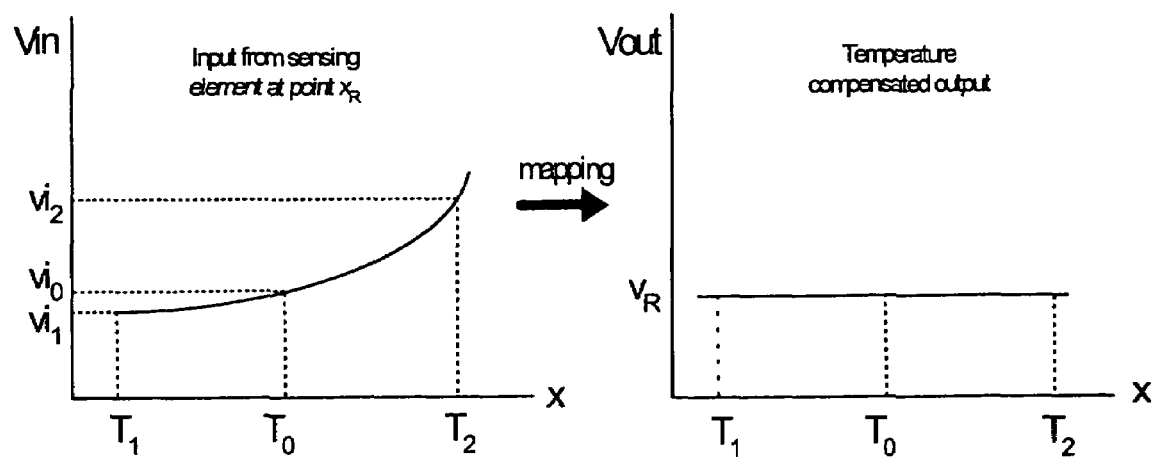
FIG. 9 is a schematic showing a mapping of a response curve of a temperature-sensitive sensor to a temperature-invariant response curve.

The disclosed embodiments are applicable not only for use in compensating for nonlinearities presented by sensors within their sensing range, but also to compensate for nonlinear temperature variations commonly presented by sensors. FIG. 9 illustrates this by way of response versus temperature graphs. The mapping is from the uncompensated left side to the compensated right side. It is assumed that the sensor at a certain fixed parameter reference point, $x_R$ outputs a signal Vin that changes over temperature. As the physical variable being sensed is fixed despite the temperature change, Vin should be compensated to show the measured parameter to be constant. This situation is similar to the one shown by FIG. 5, but now the horizontal axis represents temperature and a constant output voltage, $V_R$ is desired at $V_{out}$ for all the operating temperature range.

To keep $V_{out}=V_R$ over temperature, the 1st order Padé Approximant is applied to Vin and a system of three equations and three variables results for the temperature calibration points T1, T0, and T2:

$$\frac{a_T \cdot Vin + b_T}{c_T \cdot Vin + 1} = Vout$$

$$\begin{cases} a_T \cdot vi_0 + b_T - c_T \cdot vi_0 \cdot v_R = v_R \\ a_T \cdot vi_1 + b_T - c_T \cdot vi_1 \cdot v_R = v_R \\ a_T \cdot vi_2 + b_T - c_T \cdot vi_2 \cdot v_R = v_R \end{cases}$$

The temperature compensation coefficients aT, bT, and cT are found by solving with Cramer's Rule:

$$a_T = \frac{D_a}{D} \quad b_T = \frac{D_b}{D} \quad c_T = \frac{D_c}{D}$$

where, $$D = \begin{vmatrix} vi_0 & 1 & -vi_0 \cdot v_R \\ vi_1 & 1 & -vi_1 \cdot v_R \\ vi_2 & 1 & -vi_2 \cdot v_R \end{vmatrix} \quad D_a = \begin{vmatrix} v_R & 1 & -vi_0 \cdot v_R \\ v_R & 1 & -vi_1 \cdot v_R \\ v_R & 1 & -vi_2 \cdot v_R \end{vmatrix}$$

$$D_b = \begin{vmatrix} vi_0 & v_R & -vi_0 \cdot v_R \\ vi_1 & v_R & -vi_1 \cdot v_R \\ vi_2 & v_R & -vi_2 \cdot v_R \end{vmatrix} \quad D_c = \begin{vmatrix} vi_0 & 1 & v_R \\ vi_1 & 1 & v_R \\ vi_2 & 1 & v_R \end{vmatrix}$$

Further circuit embodiments to implement nonlinear temperature compensation according to this method are similar to the ones shown by FIG. 6 and FIG. 7, as the temperature nonlinearity coefficients are different but the transfer functions are topologically the same.

Figure 10:
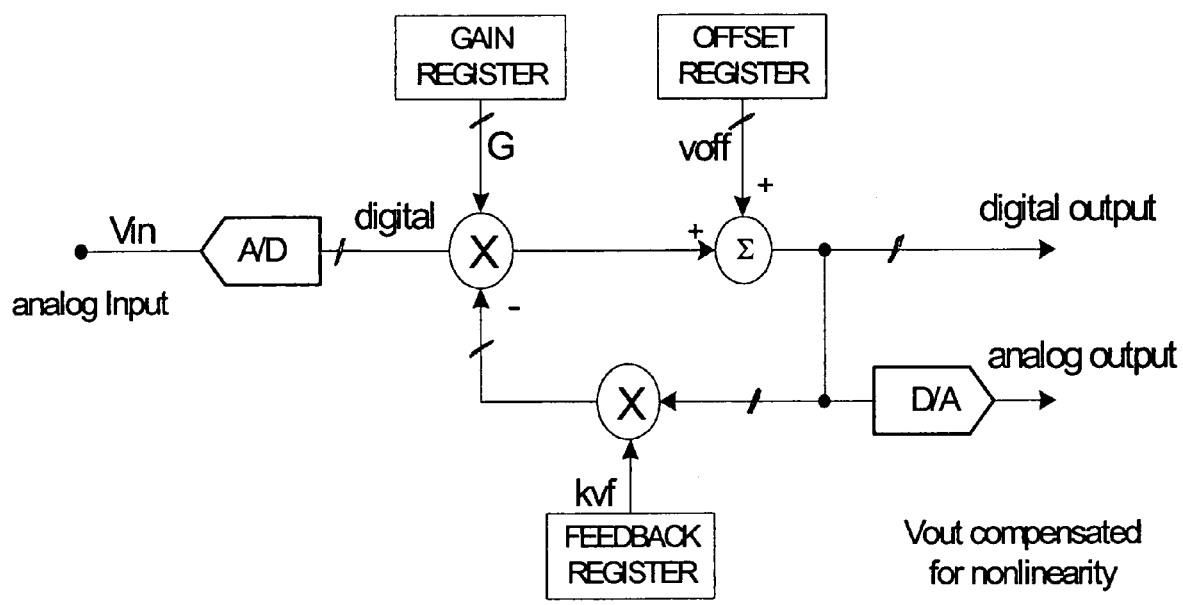
FIG. 10 is a schematic of a digitally-implemented, first order Padé Approximant compensating circuit.

Although it is better suited to be implemented by a programmable analog integrated circuit, the invented method for nonlinearity compensation can also have a digital embodiment if the input variable Vin is a digital signal. FIG. 10 shows a digital embodiment 1000 that is roughly equivalent to the analog embodiment of FIG. 6.

Figure 12:
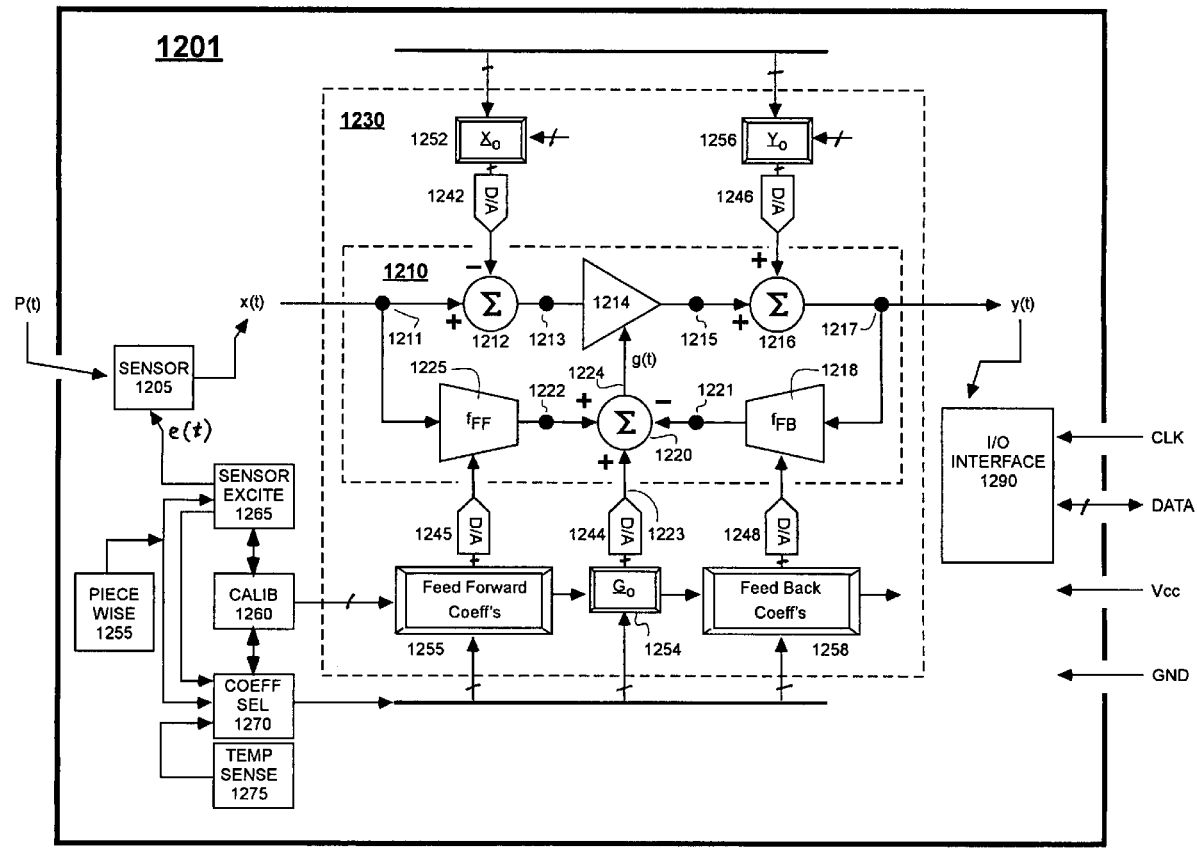
FIG. 12 is a block diagram of another sensor and sensor-containing environment in accordance with the invention.

FIG. 12 is a schematic of yet another sensor module 1201 in accordance with the disclosure. The to-be-sensed physical parameter, P(t), is coupled into the module 1201 from the external environment 1200. Coupling may be accomplished wirelessly, such as by magnetic and/or electrostatic coupling. In response to the coupled physical parameter, P(t), a corresponding primary sensor 1205 generates a corresponding, sensor output signal, x(t). In some embodiments, an excitational signal e(t) may be additionally coupled to the primary sensor 1205 from an in-module excitation source 1265. The excitational signal e(t) may be used for causing the sensor 1205 to output a suitable sensor output signal, x(t). The sensor output signal, x(t) may be a function of temperature and/or other variables in addition to being a function of P(t), and optionally of e(t). In one set of embodiments, e(t) is a sensor modulating electrical signal and sensor 1205 includes reactive components such as inductors and/or capacitors which exhibit frequency domain response to the applied excitational signal e(t), where the inductance and/or capacitance of sensor 1205 is affected by the external physical parameter P(t).

The sensor output signal, x(t) is introduced into an analog mapping circuit 1210 which produces a corresponding, mapped output signal:

$$y(t) = g(t) \cdot \{x(t) - X_o\} + Y_o \qquad \text{Eq. 3}$$

at node 1217. It may be appreciated that in the case where g(t) is a constant, m, and $X_o=0$ and $Y_o=b$; equation Eq. 3 simplifies to the well known linear transformation: y=mx+b.

In one embodiment, all of components 1212, 1214, 1216, 1218, 1220, 1225 in mapping circuit 1210 have relatively high input impedance (e.g., greater than about 100Ω), relatively low output impedance (e.g., less than about 100Ω), and relatively low power consumption. Such may be realized with use of low power CMOS technology (complementary metal-oxide-semiconductor transistors). While amplifier 1214 generally has a gain greater than unity, in one set of embodiments, the feed-forward transformation circuit 1225 and/or the feed-back transformation circuit 1218 have/has a power gain of less than unity. The latter configuration can reduce power consumption in the core mapping circuit 1210 because power (Vcc times current drawn) for signal amplification is often not needed by the feed-forward transformation circuit 1225 and/or the feed-back transformation circuit 1218 when either respectively has a power gain of less than one. Of course, alternate embodiments are possible wherein one or more of components 1212, 1214, 1216, 1218, 1220, 1225 include digital subcomponents. As a general rule, the greater the number of components, the greater the power consumption of the over all circuit since each component consumes power. Additionally, if digital circuitry with high switching frequencies is introduced into module 1201, that too will tend to increase power consumption due to power loss per switching cycle.

The operation of the mapping circuit 1210 of FIG. 12 can be expressed in Padé Approximant format by solving for g(t) as follows:

$$g(t) = -f_{FB}(y) + f_{FF}(x) + G_o \qquad \text{Eq. 4}$$

As can be seen, summing circuit 1220 produces an output signal on line 1224 equal to the sum of the $G_o$ signal provided by line 1223, plus the feed-forward signal, $f_{FF}(X)$ provided on line 1222 by the feed-forward transformation circuit 1225, minus the feed-back signal, $f_{FB}(y)$ provided on line 1221 by the feed-back transformation circuit 1218. In one embodiment, $f_{FB}(y)=m_1 \cdot y$ where $m_1$ is a constant. In the same or a different embodiment, $f_{FF}(x)=m_2 \cdot x$ where $m_2$ is a constant.

Substituting the right side of equation Eq. 4 into Eq. 3, the following Eq. 5 is obtained:

$$y(t) = [-f_{FB}(y) + f_{FF}(x) + G_o] \cdot \{x(t) - X_o\} + Y_o \qquad \text{Eq. 5}$$

Collecting the variable y terms to the left side, the following Eq. 6 is obtained:

$$y(t) \cdot [1 + f_{FB}(y)/y \cdot \{x(t) - X_o\}] = [+f_{FF}(x) + G_o] \cdot \{x(t) - X_o\} + Y_o \qquad \text{Eq. 6}$$

Finally, by dividing to form a ratiometric expression of y(t), the following Eq. 7 is obtained:

$$y(t) = \frac{[f_{FF}(x) + G_O] \cdot \{x(t) - X_O\} + Y_O}{[f_{FB}(y)/y \cdot \{x(t) - X_O\} + 1]} \qquad \text{Eq. 7}$$

By setting $f_{FF}(x)=0$ and $f_{FB}(y)=m_1 \cdot y$, equation Eq. 7 simplifies to the following Eq. 8:

$$y(t) = \frac{[0 + G_O] \cdot \{x(t) - X_O\} + Y_O}{[m_1 \cdot \{x(t) - X_O\} + 1]} \qquad \text{Eq. 8}$$

By setting $f_{FF}(x)=m_2 \cdot x$ and $f_{FB}(y)=m_1 \cdot y$, equation Eq. 7 defines the higher order Pade' Approximant of the following Eq. 9:

$$y(t) = \frac{[m_2 \cdot x + G_O] \cdot \{x(t) - X_O\} + Y_O}{[m_1 \cdot \{x(t) - X_O\} + 1]} \qquad \text{Eq. 9}$$

It is within the contemplation of the disclosure to use more complex polynomial transformations other than $f_{FF}(x)=m_2 \cdot x$ and $f_{FB}(y)=m_1 \cdot y$ for the respective FF and FB transformations of components 1225 and 1218. The number of coefficients provided by the respective FF coefficients memory 1255 and FB coefficients memory 1258 will of course, increase beyond that of simply providing $m_2$ and $m_1$. Complexity and power consumption may also increase. However, as indicated above, it may be desirable in some circumstances to keep the power gain factors of transformation circuits 1225 (FF) and 1218 (FB) below unity so as to reduce the power draw of those transformation circuits.

The operation of the programmable, first shell 1230, that surrounds the core mapping circuit 1210, should be self evident from FIG. 12. Memory unit or register 1252 stores one or more digital $X_o$ values and supplies a selectable one to analog summing unit 1212 by way of D/A converter 1242. Memory unit or register 1256 stores one or more digital $Y_o$ values and supplies a selectable one to analog summing unit 1216 by way of D/A converter 1246. Memory unit or register 1254 stores one or more digital $G_o$ values and supplies a selectable one to analog summing unit 1220 by way of D/A converter 1244. Memory unit or register 1255 stores one or more digital representations of the feed-forward transformation coefficients (e.g., $m_2$) and supplies selectable ones to the analog, feed-forward transformation circuit 1225 by way of D/A converters 1245. Memory unit or register 1258 stores one or more digital representations of the feed-back transformation coefficients (e.g., $m_1$) and supplies selectable ones to the analog, feed-back transformation circuit 1218 by way of D/A converters 1248. The specific number of components in the core mapping circuit 1210 can be reduced, and their analog versus digital nature can be modified, as will be seen (e.g., FIG. 14) to form other embodiments of the invention.

Output signals of the programmable, first shell 1230 may be modified on the fly by address signals output from the coefficients selecting unit 1270. Data contents of the memory units and/or registers in the first shell 1230 may be modified by data write signals output from calibration unit 1260.

The coefficients selecting unit 1270 may be made responsive to one or more further units, such as the in-module temperature sensing unit 1275, the in-module piece-wise mapping unit 1255 and/or the in-module sensor excitation source 1265. The sensor excitation source 1265 may be made responsive to the in-module piece-wise mapping unit 1255 for providing different sensor excitation signals for different ranges of the physical parameter P(t). (See again the piece-wise threshold detectors 156, 157 of FIG. 11.) The sensor excitation source 1265 may be made responsive to the in-module temperature sensing unit 1275 for providing different sensor excitation signals for different ranges of temperature. The coefficients selecting unit 1270 may be programmed to operate accordingly, depending on whether the in-module temperature sensing unit 1275, the in-module piece-wise mapping unit 1255 and/or the in-module sensor excitation source 1265 are used in such switched mode configurations or not. Different sensors and sensor applications may call for more or less complexity. It is to be understood that units 1270, 1275, 1265 and 1255 may be tailored accordingly either programmably or by way of hardwiring.

The calibration unit 1260 may be operatively coupled to the illustrated I/O interface unit 1290 for receiving control and data signals as appropriate for carrying out calibration operations, including the writing of new coefficient data into the memory units 1252–1258 and the optional verification of such data storage operations. In one embodiment, the module 1201 has just four interconnect terminals for coupling the I/O interface unit 1290 to external systems. The four interconnect terminals may be comprised of a serial clock terminal for carrying a serial clock signal, a serial data terminal for carrying a bidirectional serial data signal, a Vcc terminal for receiving a power voltage and a ground terminal (GND). In some applications there may be more than one ground terminal, e.g. one for power and one for control signals. The I/O interface unit 1290 may have further interconnect nodes that are used during manufacture and testing but are buried inside the module and not easily accessed when the module is in the field environment 1200.

Figure 13:
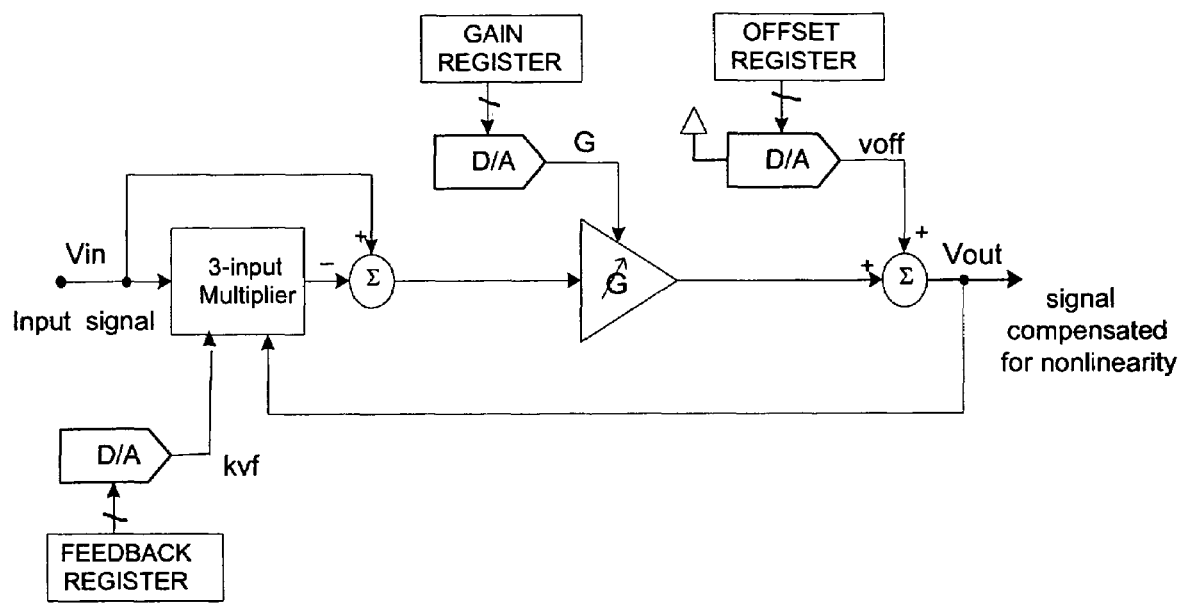
FIG. 13 is a schematic of an embodiment having a 3-input multiplier at the front end of the mapping circuit.

Many variations may be made to the exemplary embodiments discussed thus far. FIG. 13 is a schematic of an embodiment having a 3-input analog multiplier at the front end of the mapping circuit. It is understood that the 3-input multiplier presents a relatively high input impedance to the $V_{in}$ signal as does the adder which also receives the $V_{in}$ signal. Just three programmable registers are used in the embodiment of FIG. 13 for setting the $k_{vf}$ coefficient, the $G_o$ coefficient, and the $v_{off}$ coefficient. The slashes across the output lines of the D/A units indicate that slashed lines carry digital rather than analog signals. In one embodiment, the $k_{vf}$ coefficient is less than unity.

Figure 14:
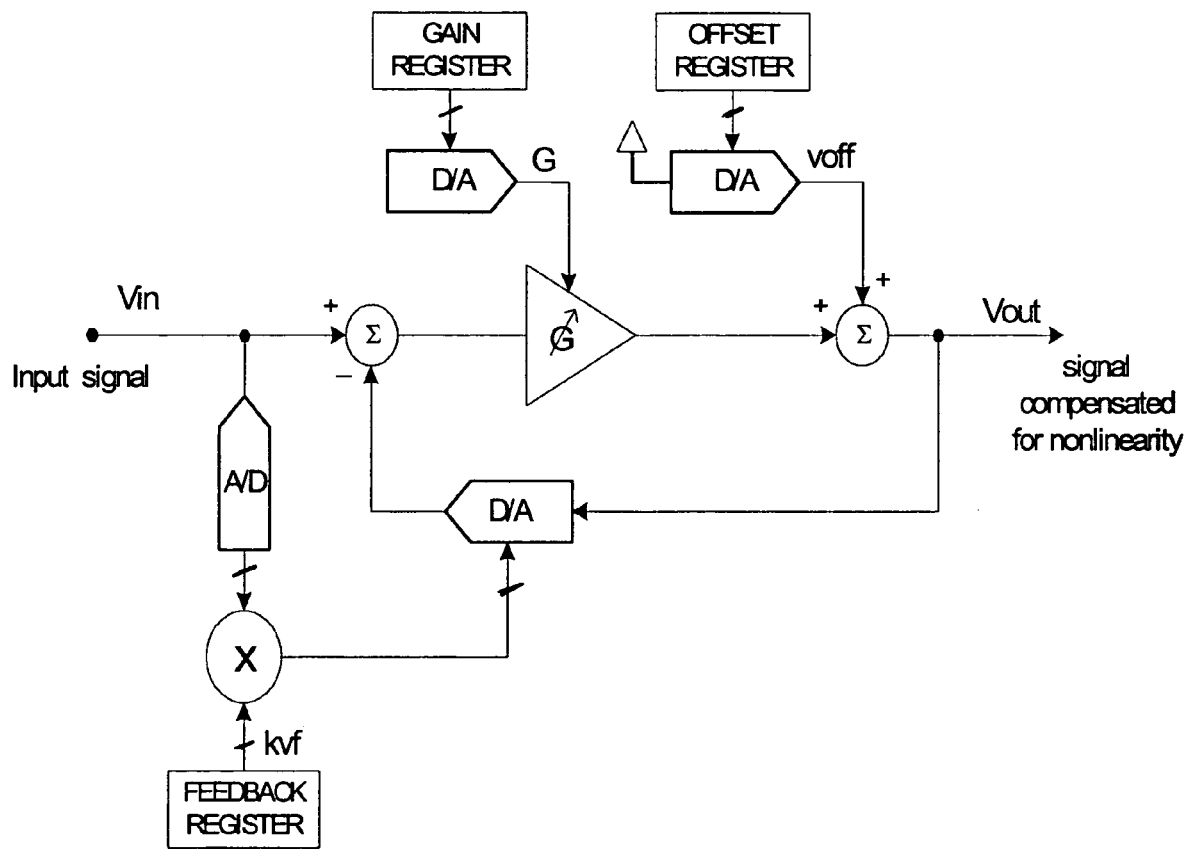
FIG. 14 is a schematic of an embodiment having a digital input multiplier at the front end of the mapping circuit.

FIG. 14 is a schematic of an embodiment having a digital input multiplier at the front end of the mapping circuit. A high input impedance A/D unit converts the analog $V_{in}$ signal to a corresponding digital $V_{in}$ signal. The latter signal is multiplied by the $k_{vf}$ coefficient in the digital input multiplier. Thereafter, a D/A converter converts the resulting $k_{vf}V_{in}$ signal back to the analog domain. The main path of the analog $V_{in}$ signal remains as an analog one through the analog summing units and the variable gain amplifier. The main path is therefore still substantially free of digitization noise. Since the $k_{vf}$ coefficient is usually less than unity in one embodiment of FIG. 14, digitization noise from the A/D unit is not a major factor.

Figure 15:
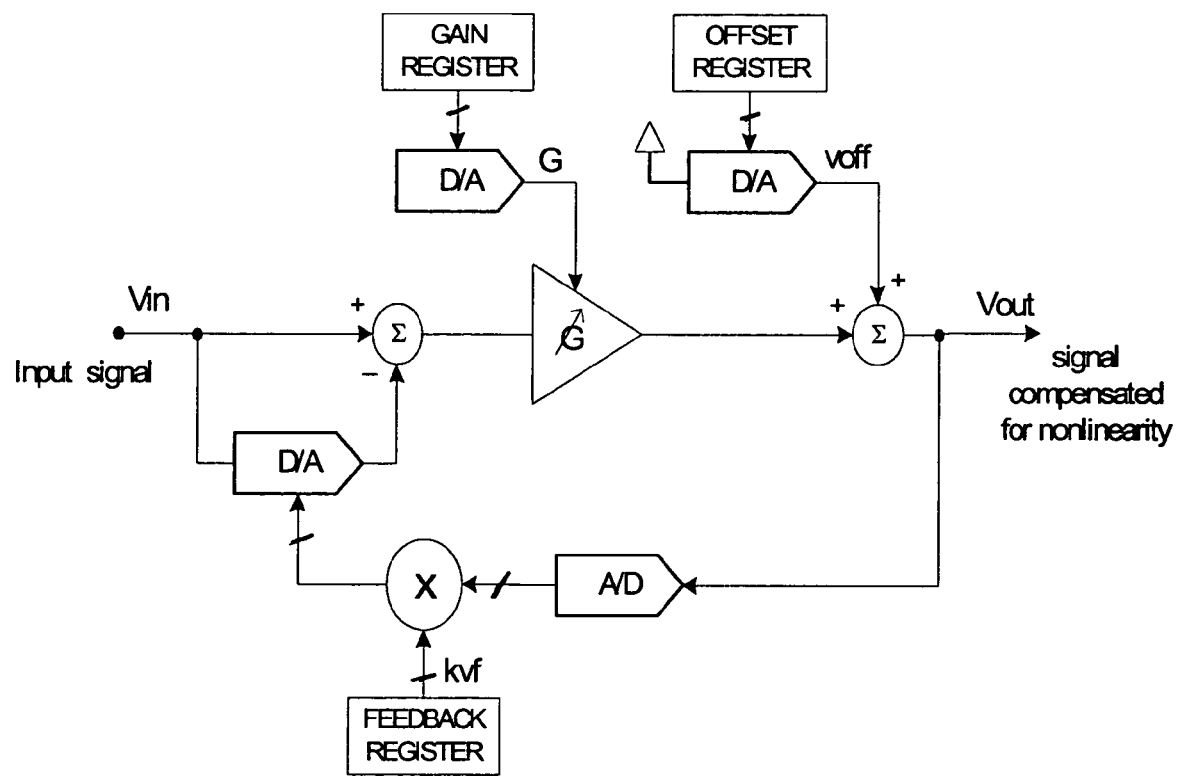
FIG. 15 is a schematic of an embodiment having a digital input multiplier at the front end of the mapping circuit receiving feedback from the output.

FIG. 15 is a schematic of an embodiment 1500 having a digital input multiplier (the leftmost D/A converter) at the front end of the mapping circuit and a further digital multiplier receiving feedback from the output.

Figure 16:
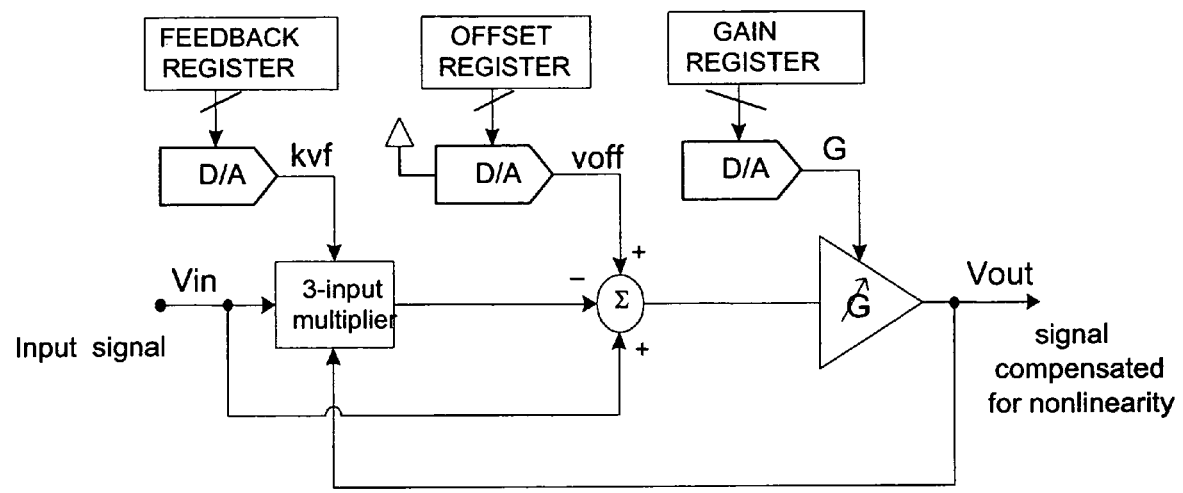
FIG. 16 is a schematic of a further embodiment having a 3-input multiplier at the front end of the mapping circuit.

FIG. 16 is a schematic of a further embodiment 1600 having a 3-input multiplier at the front end of the mapping circuit and 3-input summer before the variable gain amplifier.

Figure 17:
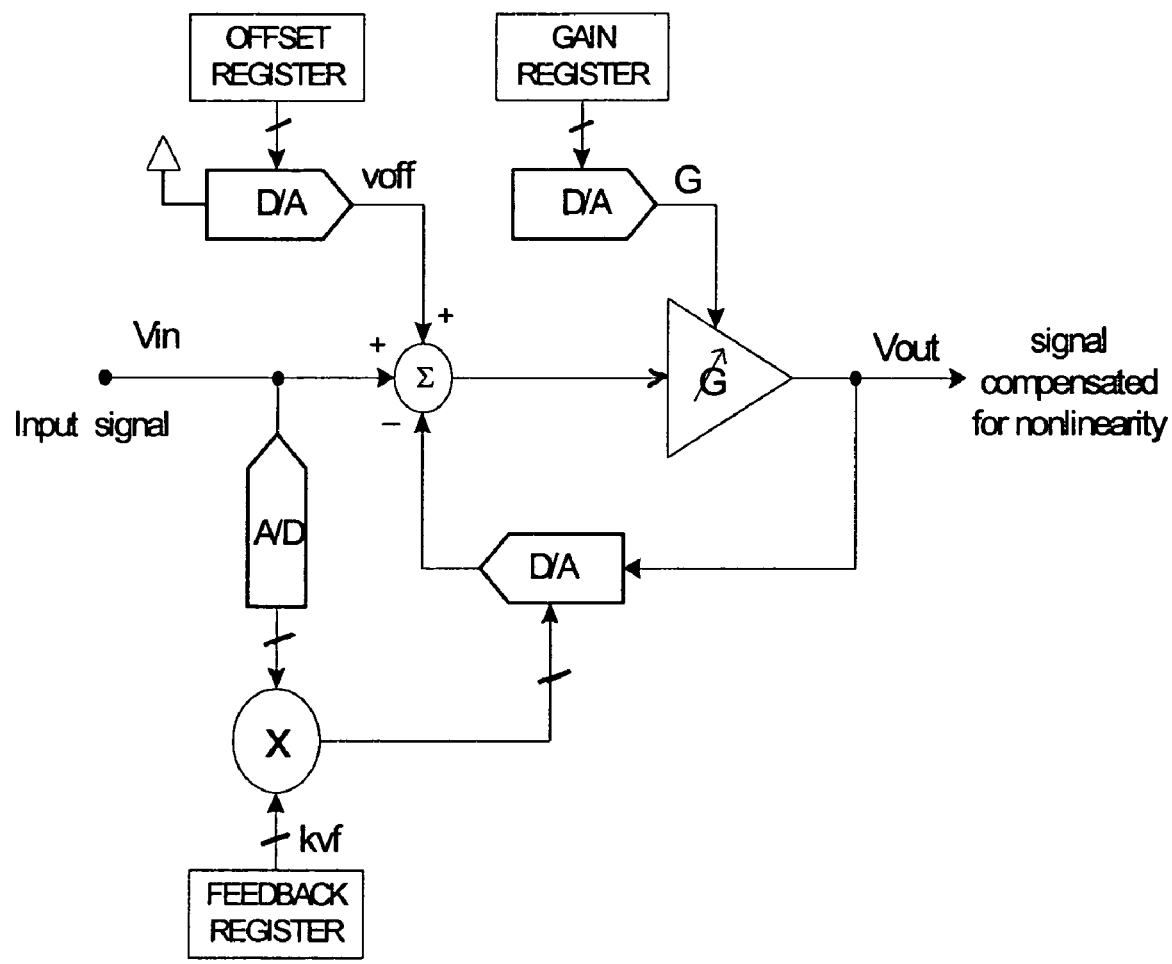
FIG. 17 is a schematic of a further embodiment.

FIG. 17 is a schematic of a further embodiment 1700 that relies on multiplication in the digital domain.

Figure 18:
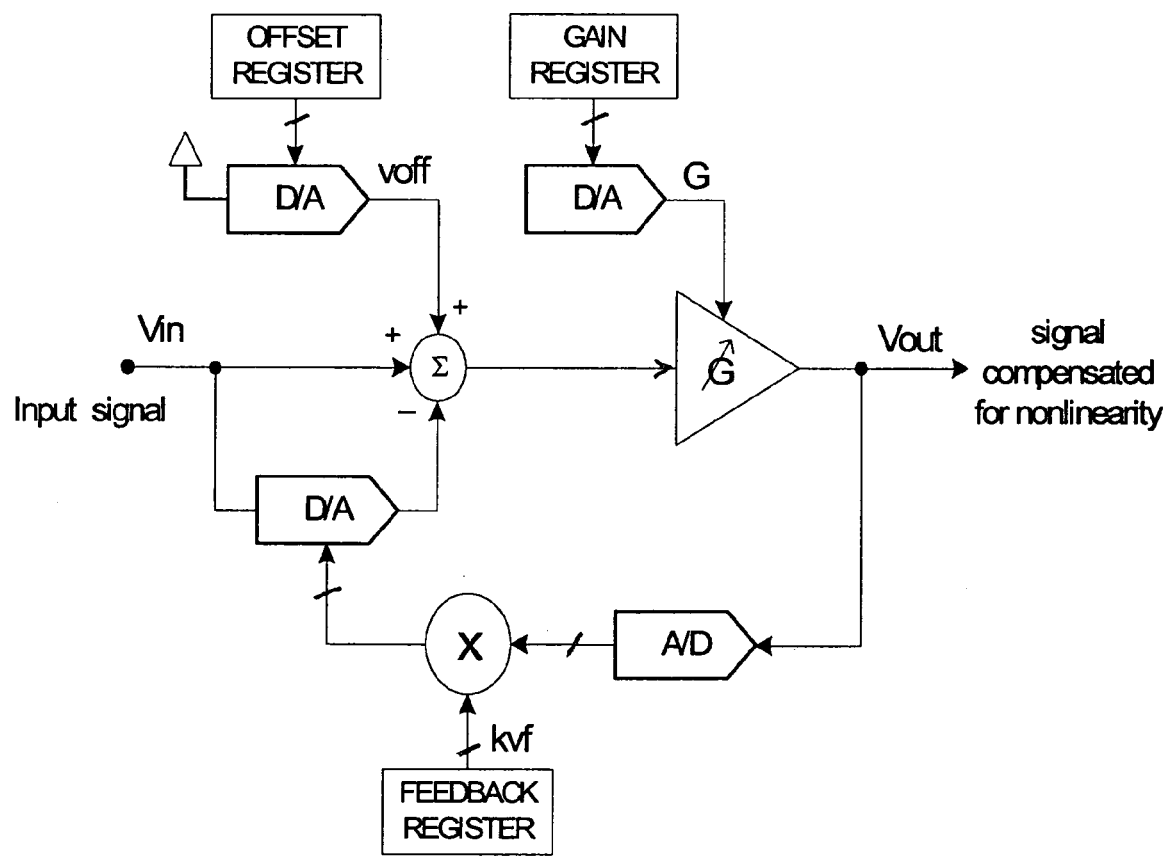
FIG. 18 is a schematic of a further embodiment.

FIG. 18 is a schematic of a further embodiment 1800.

Figure 19:
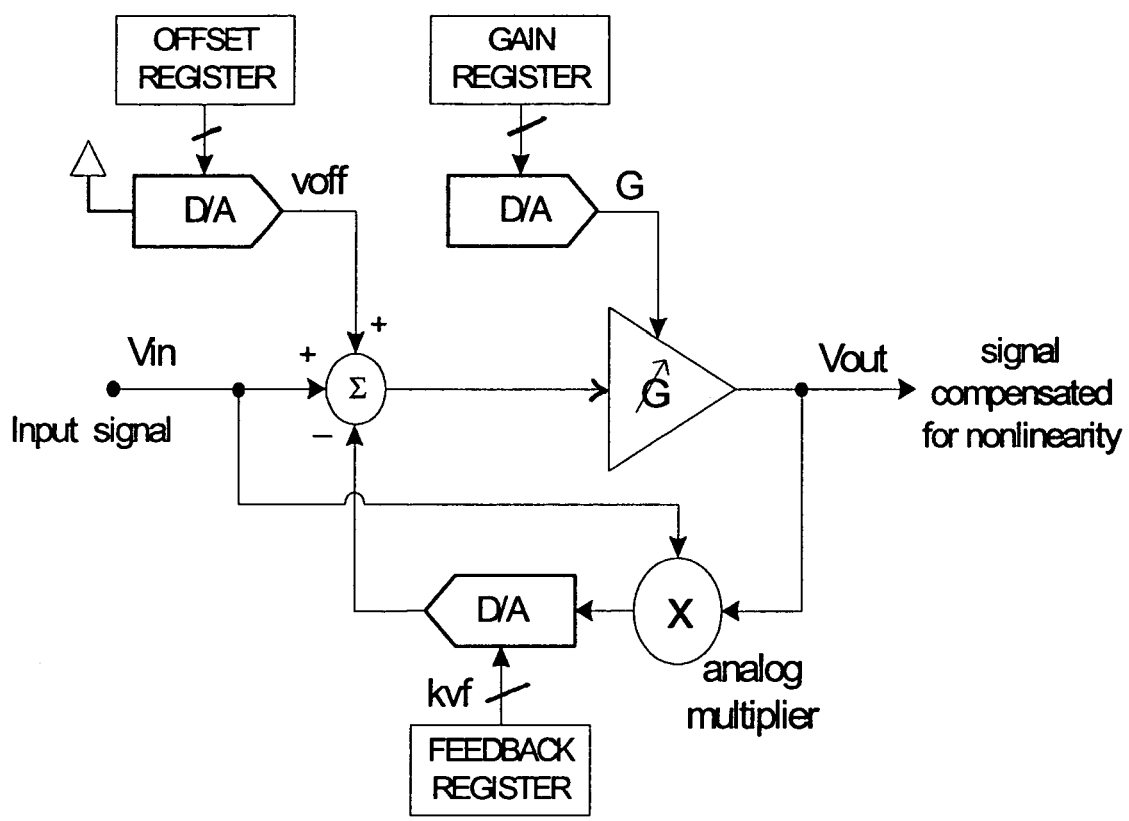
FIG. 19 is a schematic of a further embodiment.

FIG. 19 is a schematic of a further embodiment 1900 which includes an analog multiplier receiving the $V_{out}$ signal.

FIG. 10, as already discussed is a schematic of a mostly-digital embodiment 1000. $V_{in}$ may be converted to digital format if not already in that format, by the front end A/D converter. $V_{out}$ may be converted to analog format by the back end D/A converter if such an analog output format is needed. Otherwise, the already digitized $V_{out}$ signal may be serially output from the module via the serial data link. (See again the I/O interface 1290 of FIG. 12.)

Although most of the embodiments discussed herein include $1^{st}$ order Padé Approximant means for providing nonlinearity compensation, the present invention can be extended to higher order Padé Approximants, including those where numerator and denominator have different orders. It should be clear that there could be variations to the embodiments and those variations would be within the spirit and scope of the present invention. Accordingly, many modifications may be made by one of ordinary skill in the art in view of the above without departing from the spirit and scope of the appended claims. There are no fundamental limits to be associated to the invention. However, performance can be optimized by appropriate selection of the sensor input range or sub-ranges and by making sure the sensor nonlinearity is not too severe or non-monotonic within the range or any individual sub-range. Also, DACs with a relatively large number of bits allow for a finer granularity in the coefficients and enable higher overall accuracy. Higher order Padé Approximants and a larger number of calibration points can also increase overall accuracy. The invention provides for simple, low cost solutions that are suitable to automation, programmable with as little as three calibration points, and potentially more accurate than competing methods. The invention is suitable for embedded systems. Its analog form does not introduce quantization error in the forward signal path. This makes it applicable to all sorts of sensor nonlinearities. The invention allows both nonlinearity compensation and sensor calibration in a single functional block. It does not require feedback to sensor excitation sources, as might be called for in some sensor bridge circuits.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A system comprising:
   (a) a variable gain amplifier having a first input terminal coupled to receive a first input signal, the amplifier further having a first output terminal for outputting a first output signal that is a function of the first input signal, and a gain control terminal controlling a variable gain applied to the first input signal;
   (b) a first summer, operatively coupled to the first output terminal for adding a first offset signal to the first output signal, the first summer having a second output terminal;
   (c) a first multiplier, operatively coupled to the second output terminal, the first multiplier having a feedback factor terminal for receiving a proportional feedback factor signal and the first multiplier having a third output terminal for outputting a multiplied feedback signal representing the offset first output signal multiplied by the proportional feedback factor signal;
   (d) a second summer, operatively coupled to the third output terminal, for adding a second offset signal to the multiplied feedback signal, the second summer having a fourth output terminal; and
   (e) a second multiplier, operatively coupled to the fourth output terminal, the second multiplier having a gain factor terminal for receiving a gain factor signal and the second multiplier having a fifth output terminal for outputting a multiplied gain signal representing the output of the fourth output terminal multiplied by the gain factor signal;
   wherein the gain control terminal of the variable gain amplifier is operatively coupled to the fifth output terminal.

2. The system of claim 1 and further comprising:
   (f) a primary sensor operatively coupled to supply said first input signal to the first input terminal of the variable gain amplifier.

3. The system of claim 2 and further comprising:
   (g) coefficient defining means, coupled to at least one of the first summer, first multiplier, second summer and second multiplier, for respectively defining at least one of the first offset signal, proportional feedback factor signal, second offset signal and gain factor signal.

4. The system of claim 3 and further comprising:
   (h) a temperature sensor operatively coupled to the coefficient defining means for causing the coefficient defining means to define at least one of the first offset signal, proportional feedback factor signal, second offset signal and gain factor signal in response to a sensed temperature.

5. The system of claim 3 and further comprising:
   (h) a threshold detector operatively coupled to the coefficient defining means for causing the coefficient defining means to re-define at least one of the first offset signal, proportional feedback factor signal, second offset signal and gain factor signal in response to a sensed crossing of the first input signal across a first predetermined threshold.

6. The system of claim 5 wherein said primary sensor is packaged in a module together with said variable gain amplifier.

7. The system of claim 5 wherein:
   (h.1) said threshold detector is also for causing the coefficient defining means to re-define at least one of the first offset signal, proportional feedback factor signal, second offset signal and gain factor signal in response to a sensed crossing of another operational signal across a second predetermined threshold.

8. The system of claim 3 and further comprising:
   (h) an excitation source operatively coupled to the primary sensor to supply an excitation signal to the primary sensor, wherein the coefficient defining means is coupled to and responsive to the excitation source.

9. The system of claim 3 and further comprising:
   (h) calibration means, coupled to the coefficient defining means, for causing the coefficient defining means to define at least one of the first offset signal, proportional feedback factor signal, second offset signal and gain factor signal in accordance with a plurality of predefined physical parameters applied to the primary sensor.

* * * * *